(12) United States Patent
Latapie et al.

(10) Patent No.: US 12,008,486 B2
(45) Date of Patent: Jun. 11, 2024

(54) COGNITIVE AUTOMATION FOR NETWORKING, SECURITY, IoT, AND COLLABORATION

(71) Applicant: Cisco Technology, Inc., San Jose, CA (US)

(72) Inventors: Hugo Latapie, Long Beach, CA (US); Ozkan Kilic, Long Beach, CA (US); Ramana Rao V. R. Kompella, Cupertino, CA (US); Myungjin Lee, Bellevue, WA (US); Simon Matthew Young, Victoria (AU)

(73) Assignee: Cisco Technology, Inc., San Jose, CA (US)

( * ) Notice: Subject to any disclaimer, the term of this patent is extended or adjusted under 35 U.S.C. 154(b) by 432 days.

(21) Appl. No.: 17/173,380

(22) Filed: Feb. 11, 2021

(65) Prior Publication Data
US 2021/0279615 A1    Sep. 9, 2021

Related U.S. Application Data

(60) Provisional application No. 62/984,668, filed on Mar. 3, 2020.

(51) Int. Cl.
*G06N 5/043* (2023.01)
*G06N 3/042* (2023.01)
*G06N 3/088* (2023.01)
*G06N 5/02* (2023.01)

(52) U.S. Cl.
CPC ............ *G06N 5/043* (2013.01); *G06N 3/042* (2023.01); *G06N 5/02* (2013.01); *G06N 3/088* (2013.01)

(58) Field of Classification Search
None
See application file for complete search history.

(56) References Cited

U.S. PATENT DOCUMENTS

| 10,362,113 B2 | 7/2019 | Bhadra |
| 10,887,197 B2 | 1/2021 | Fenoglio et al. |
| 10,965,516 B2 | 3/2021 | Fenoglio et al. |
| (Continued) | | |

OTHER PUBLICATIONS

Speer, Robyn, Joshua Chin, and Catherine Havasi. "Conceptnet 5.5: An open multilingual graph of general knowledge." Proceedings of the AAAI conference on artificial intelligence. vol. 31. No. 1. 2017. (Year: 2017).*

(Continued)

*Primary Examiner* — Eric Nilsson
(74) *Attorney, Agent, or Firm* — BEHMKE INNOVATION GROUP LLC; James M. Behmke; James J. Wong

(57) ABSTRACT

In one embodiment, a device maintains a metamodel that describes a monitored system. The metamodel comprises a plurality of layers ranging from a sub-symbolic space to a symbolic space. The device tracks updates to the metamodel over time. The device updates the metamodel based in part on sub-symbolic time series data generated by the monitored system. The device receives, from a learning agent, a request for the updates to a particular layer of the metamodel associated with a specified time period. The device provides, to the learning agent, data indicative of one or more updates to the particular layer of the metamodel associated with the specified time period.

18 Claims, 23 Drawing Sheets

(56) References Cited

U.S. PATENT DOCUMENTS

| | | | |
|---|---|---|---|
| 2019/0102430 A1 | 4/2019 | Wang et al. | |
| 2019/0306011 A1 | 10/2019 | Fenoglio et al. | |
| 2020/0242199 A1* | 7/2020 | Ploennigs | G06N 20/00 |
| 2021/0042532 A1 | 2/2021 | Latapie et al. | |
| 2021/0174155 A1 | 6/2021 | Smith et al. | |
| 2021/0279615 A1 | 9/2021 | Latapie et al. | |
| 2021/0390423 A1 | 12/2021 | Latapie et al. | |

OTHER PUBLICATIONS

Donati, Lorenzo, et al. "Domain Adaptation through Deep Neural Networks for Health Informatics." 2017. (Year: 2017).*

Hassine, Taoufik Ben, Oualid Khayati, and Henda Ben Ghezala. "An IoT domain meta-model and an approach to software development of IoT solutions." 2017 International Conference on Internet of Things, Embedded Systems and Communications (IINTEC). IEEE, 2017. (Year: 2017).*

U.S. Appl. No. 16/708,648, filed Dec. 10, 2019, Latapie, Hugo et al.

Mishra, et al., "A Cognitive Adopted Framework for IoT Big-Data Management and Knowledge Discovery Prospective", online: https://journals.sagepub.com/doi/full/10.1155/2015/718390, International Journal of Distributed Sensor Networks, Oct. 5, 2015, 24 pages.

Latapie, et al., "A Metamodel and Framework for AGI", online: https://www.researchgate.net/publication/344013079_A_Metamodel_and_Framework_for_AGI, Sep. 6, 2020, 14 pages, arXiv:2008.12879v2 [cs.AI].

Wang, Pei, "A Logical Model of Intelligence—An Introduction to NARS", online: https://cis.temple.edu/~pwang/NARS-Intro.html, Nov. 15, 2020, 6 pages, Temple University.

Lofthouse, Tony, "NARS an Artificial General Intelligence Project", online: https://cis.temple.edu/tagit/events/AEGAP2019_files/NARS_Tutorial_AGI-19.pptx, Aug. 10, 2019, 30 pages, Temple University.

Wang, Pei, "Toward a Logic of Everyday Reasoning", online: https://cis.temple.edu/~pwang/Publication/EverydayReasoning.pdf, Apr. 2019, 28 pages, Temple University.

Wang, Pei, "The Logic of Learning", online: https://cis.temple.edu/~ pwang/Publication/learning.pdf, 2019, 4 pages, American Association for Artificial Intelligence.

Wang, Pei, "Solving a Problem With or Without a Program", Dec. 2012, 31 pages, Journal of Artificial General Intelligence 3(3).

Claise, B., et al., "Service Assurance for Intent-based Networking Architecture", Internet Draft, draft-claise-opsawg-service-assurance-architecture-01, Nov. 16, 2019, 14 pages, IETF Trust.

"What is Knowledge Graph?", online: https://www.ontotext.com/knowledgehub/fundamentals/what-is-a-knowledge-graph/, printed Feb. 2, 2021, 8 pages, OntoText.com.

Agrawal, et al., "VQA: Visual Question Answering", Proceedings of the IEEE International Conference on Computer Vision (ICCV), 2015, 25 pages, arXiv:1505.00468v7 [cs.CL].

Aleksander, Igor, "Machine consciousness" In Scholarpedia. 3(2):4162, Oct. 21, 2011, 7 pages.

Anderson, et al., "Bottom-Up and Top-Down Attention for Image Captioning and Visual Question Answering", 2018 IEEE/CVF Conference on Computer Vision and Pattern Recognition, Jun. 2018, pp. 6077-6086, IEEE, Salt Lake City, Utah.

Baudrillard, Jean, "Simulacra and Simulation", 1981, 159 pages, Galilee.

Baz, et al., "Context-aware hybrid classification system for fine-grained retail product recognition", 2016 IEEE 12th Image, Video, and Multidimensional Signal Processing Workshop (IVMSP), Jul. 2016, 5 pages, IEEE, Bordeaux, France.

Bělohlávek, Radim, "Concept lattices and order in fuzzy logic", Annals of Pure and Applied Logic 128 (2004) 277-298, Elsevier.

Box, G. E. P., "Science and Statistics", In Journal of the American Statistical Association, 71(356), Dec. 1976, pp. 791-799.

Chalmers, David J., "The Conscious Mind: In Search of a Fundamental Theory", 1996, 433 pages, Oxford University Press, New York.

Chella, et al., "A cognitive framework for imitation learning", Robotics and Autonomous Systems 54, Mar. 2006, pp. 403-408, Elsevier.

Chella, et al., "Artificial Consciousness", Chapter 20, In Perception-Action Cycle, 2011, pp. 637-671, Springer, New York.

Chella, et al., "Machine Consciousness: A Manifesto for Robotics", In International Journal of Machine Consciousness, 1(1), Jun. 2009, pp. 33-51, World Scientific Publishing Company.

Cohen, Paul R., "Projections as Concepts", Computer Science Department Faculty Publication Series (194), https://scholarworks.umass.edu/cs/_faculty/_pubs/194, 1997, 6 pages, University of Massachusetts, Amherst.

Cui, et al., "A survey on network embedding", IEEE Transactions on Knowledge and Data Engineering, vol. 31, Issue: 5, May 1, 2019, pp. 833-852, IEEE.

De Bono, Edward, "The Mechanism of Mind", 1967, 276 pages, Penguin Books.

Düntsch, et al., "Modal-style operators in qualitative data analysis", 2002 IEEE International Conference on Data Mining, 2002. Proceedings, Dec. 2002, pp. 155-162, IEEE, Maebashi City, Japan.

Franco, et al., "Grocery product detection and recognition", Expert Systems With Applications 81 (2017), pp. 163-176, Elsevier Ltd.

Gärdenfors, Peter, "Conceptual Spaces: The Geometry of Thought", 2000, 398 pages, MIT Press.

George, et al., "Recognizing Products: A Per-exemplar Multi-label Image Classification Approach", ECCV 2014, Part II, LNCS 8690, 2014, pp. 440-455, Springer International Publishing Switzerland.

Goertzel, et al., "CogPrime Architecture for Embodied Artificial General Intelligence", 2013 IEEE Symposium on Computational Intelligence for Human-like Intelligence (CIHLI), Apr. 2013, pp. 60-67, IEEE, Singapore.

Goertzel, Ben, "OpenCogPrime: A Cognitive Synergy Based Architecture for Artificial General Intelligence", 2009 8th IEEE International Conference on Cognitive Informatics, Jun. 2009, pp. 60-68, IEEE, Hong Kong, China.

Gorban, et al., "Blessing of dimensionality: mathematical foundations of the statistical physics of data", Philosophical Transactions of the Royal Society A: Mathematical, Physical and Engineering Sciences, 376.2118, Jan. 2008, 18 pages, The Royal Society Publishing.

Grover, et al., "node2vec: Scalable Feature Learning for Networks", KDD '16: Proceedings of the 22nd ACM SIGKDD International Conference on Knowledge Discovery and Data Mining, Aug. 2016, pp. 855-864, Association for Computing Machinery, New York, NY.

Hamilton, et al., "Representation Learning on Graphs: Methods and Applications", Bulletin of the IEEE Computer Society Technical Committee on Data Engineering, 2017, 23 pages, IEEE.

Hammer, et al., "A Reasoning Based Model for Anomaly Detection in the Smart City Domain", IntelliSys 2020, AISC 1251, pp. 144-159, 2021, Springer Nature Switzerland AG.

Hobbs, Jerry R., "Granularity", In Proceedings of the Ninth International Joint Conference on Artificial Intelligence, 1985, pp. 432-435, Morgan Kaufmann.

Horowitz, Alexandra, "Smelling themselves: Dogs investigate their own odours longer when modified in an "olfactory mirror" test", Behavioural Processes, 2017, 41 pages.

Johnson, Mark, "The Body in The Mind", 1987, 268 pages, The University of Chicago Press.

Kiryati, et al., "A probabilistic Hough transform", Pattern Recognition. 24(4), 1991, pp. 303-316, The Pattern Recognition Society.

Korzybski, Alfred, "Manhood Of Humanity, The Science and Art of Human Engineering", 1921, 240 pages, E. P. Dutton & Company, New York, NY.

Korzybski, Alfred, "Science and Sanity: An Introduction to Non-Aristotelian Systems and General Semantics", 5th Edition, 1994, 910 pages, Institute of General Semantics, New York, NY.

Korzybski, Alfred, "Videos—This Is Not That", online: https://www.thisisnotthat.com/korzybski-videos/, accessed Nov. 18, 2021, 7 pages.

Lakoff, G., "Women, Fire, and Dangerous Things", 1984, 631 pages, University of Chicago Press.

(56) References Cited

OTHER PUBLICATIONS

Latapie, et al., "A Metamodel and Framework for Artificial General Intelligence From Theory to Practice", Journal of Artificial Intelligence and Consciousness, Feb. 12, 2021, 1:30, 24 pages, World Scientific Publishing Company.
Li, et al., "Concept learning via granular computing: A cognitive viewpoint", Information Sciences 298 (2015), Published Dec. 2014, pp. 447-467, Elsevier Inc.
Lieto, et al., "Conceptual Spaces for Cognitive Architectures: A Lingua Franca for Different Levels of Representation", Biologically Inspired Cognitive Architectures 19, May 2017, 17 pages, Cognitive Robotics and Social Sensing Lab.
Ma, et al., "Granular computing and Dual Galois Connection", Information Sciences, 177(23), 2007, pp. 5365-5377, Elsevier Inc.
Macaulay, Thomas, "Facebook's chief AI scientist says GPT-3 is 'not a very good' Q&A system", online: https://thenextweb.com/news/facebooks-yann-lecun-says-gpt-3-is-not-very-good-as-a-qa-or-dialog-system, Oct. 28, 2020, accessed Nov. 18, 2021, 3 pages.
Murahari, et la., "Improving Generative Visual Dialog by Answering Diverse Questions", Proceedings of the 2019 Conference on Empirical Methods in Natural Language Processing and the 9th International Joint Conference on Natural Language Processing, Nov. 2018, pp. 1449-1454, Association for Computational Linguistics, Hong Kong, China.
Patel, et al., "Video Representation and Suspicious Event Detection Using Semantic Technologies", online: http://semantic-web-journal.net/system/files/swj2427.pdf, Semantic Web 0, Sep. 10, 2020, accessed Aug. 9, 2021, 25 pages, IOS Press.
Pauli, Wolfgang, "Part I. General: (A) theory. Some relations between electrochemical behaviour and the structure of colloids", Jan. 1935, pp. 11-27, Transactions of the Faraday Society, vol. 1.
Scarselli, et al., "The Graph Neural Network Model", IEEE Transactions on Neural Networks (vol. 20, Issue: 1, Jan. 2009), pp. 61-80, IEEE.
Searle, John R., "The Rediscovery of the Mind", 1992, 104 pages, MIT Press.
Speer, et al., "ConceptNet 5.5: An Open Multilingual Graph of General Knowledge", online: https://arxiv.org/pdf/1612.03975.pdf, 2017, 9 pagers, Association for the Advancement of Artificial Intelligence.
Swanson, Bret, "The Exponential Internet", online: https://www.uschamberfoundation.org/bhq/exponential-internet, accessed Nov. 19, 2021, 8 pages, The U.S. Chamber of Commerce Foundation.
Tan, et al., "EfficientDet: Scalable and Efficient Object Detection", online: https://arxiv.org/pdf/1911.09070.pdf, Jul. 2020, 10 pages.
Taylor, J. G., "CODAM: A neural network model of consciousness", Neural Networks 20 (2007), pp. 983-992, Elsevier Ltd.
Taylor, J. G., "William James on Consciousness Beyond the Margin", 1996, 231 pages, Princeton University Press.
Thórisson, et al., "Cumulative Learning", Artificial General Intelligence—12th International Conference, AGI 2019, Proceedings, pp. 198-208, Springer.
Thórisson, Kristinn R., "A New Constructivist AI: From Manual Methods to Self-Constructive Systems", Chapter 9, Apr. 2012, pp. 147-174, Atlantis Press Book.
Thórisson, Kristinn R., "Integrated AI Systems", Minds & Machines 17, Mar. 2007, pp. 11-25.
Tonioni, et al., "Product recognition in store shelves as a sub-graph isomorphism problem", online: https://arxiv.org/abs/1707.08378, Sep. 2017, 14 pages.
Unger, et al., "The Singular Universe and the Reality of Time: A Proposal in Natural Philosophy", 2015, 558 pages, Cambridge University Press.
Unger, R. M. 2014. "Roberto Unger: Free Classical Social Theory from Illusions of False Necessity", Online Lecture. 45 pages Retrieved on Nov. 22, 2021 from https://www.youtube.com/watch?v=yYOOwNRFTcY.
Wang, et al., "Concept Analysis via Rough Set and AFS Algebra", Information Sciences 178 (2008), pp. 4125-4137, Elsevier Inc.
Wang, Pei, "Experience-grounded semantics: a theory for intelligent systems", Aug. 2004, 33 pages, Elsevier Science.
Wang, Pei, "Insufficient Knowledge and Resources—A Biological Constraint and Its Functional Implications", Biologically Inspired Cognitive Architectures II: Papers from the AAAI Fall Symposium (FS-09-01), 2009, pp. 188-193, Association for the Advancement of Artificial Intelligence (www.aaai.org).
Wang, Pei, "Non-axiomatic logic (nal) specification", online: http://citeseerx.ist.psu.edu/viewdoc/download?doi=10.1.1.167.2069&rep=rep1&type=pdf, Oct. 2009, 88 pages.
Wang, Pei, "On Defining Artificial Intelligence", Journal of Artificial General Intelligence 10(2) 2019, pp. 1-37, Sciendo.
Wang, Pei, "Rigid Flexibility—The Logic of Intelligence", Draft for Comment, Feb. 8, 2004, 329 pages, mindspring.com.
Wang, et al. "Self in NARS, an AGI System", vol. 5, Article 20, Mar. 2018, 15 pages, Frontiers in Robotics and AI.
Wang, et al., "SuperGLUE: A Stickier Benchmark for General-Purpose Language Understanding Systems", online: https://arxiv.org/pdf/1905.00537.pdf, 2019, 29 pages, 33rd Conference on Neural Information Processing Systems (NeurIPS 2019), Vancouver, Canada.
Wikipedia, "Wheat and chessboard problem", online: https://en.wikipedia.org/wiki/Wheat_and_chessboard_problem, Oct. 2021, 5 pages, Wikimedia Foundation, Inc.
Wille, Rudolf, "Restructuring Lattice Theory: An Approach Based on Heirarchies of Concepts", I. Rival (Ed.), Ordered Sets, 1982, pp. 314-339.
Yao, et al., "A Granular Computing Paradigm for Concept Learning", Emerging Paradigms in Machine Learning, Springer, London, pp. 307-326, 2012.
Yao, Y. Y., "Information Granulation and Rough Set Approximation", International Journal of Intelligent Systems, vol. 16, No. 1, 87-104, 2001.
Yao, Y. Y., "Integrative levels of granularity", Human-Centric Information Processing Through Granular Modelling, 2009, 20 pages, Studies in Computational Intelligence, vol. 182. Springer, Berlin, Heidelberg.
Ying, et al., "Graph convolutional neural networks for web-scale recommender systems", online: https://arxiv.org/pdf/1806.01973.pdf, In KDD '18: The 24th ACM SIGKDD International Conference on Knowledge Discovery & Data Mining, Aug. 19-23, 2018, London, United Kingdom. ACM, New York, NY, USA, 10 pages.
Zhou, et al., "Graph neural networks: A review of methods and applications", AI Open, 2020, pp. 57-81, Elsevier B.V.
Zhu, et al., "Describing Unseen Videos via Multi-modal Cooperative Dialog Agents" Computer Vision—ECCV 2020, 17 pages, Lecture Notes in Computer Science, vol. 12368. Springer.

\* cited by examiner

COGNITIVE AUTOMATION FOR NETWORKING, SECURITY, IoT, AND COLLABORATION

RELATED APPLICATION

This application claims priority to U.S. Provisional Patent Application No. 62/984,668, filed on Mar. 3, 2020, entitled "COGNITIVE AUTOMATION FOR NETWORKING, SECURITY, IoT, AND COLLABORATION" by Latapie et al., the contents of which are incorporated by reference herein.

TECHNICAL FIELD

The present disclosure relates generally to computer networks, and, more particularly, to cognitive automation for networking, security, the Internet of Things (IoT), and Collaboration.

BACKGROUND

Machine learning has revolutionized many aspects of the management of a computer network. More specifically, machine learning has proven itself quite capable of identifying complex patterns in a network in terms of traffic, resource utilization, quality of service (QoS), and the like. For example, a deep learning model may be trained to detect patterns in a network that are likely to indicate that a failure of a device, link, tunnel, etc., is going to occur.

Unfortunately, machine learning systems often operate as a "black box" whereby the recognized patterns, as well as any inferences, are indecipherable by a user. Indeed, many machine learning models used to analyze networks today are highly multimodal and, particularly in the case of deep learning, entail training multiple hidden layers in a neural network. Consequently, a network administrator may be unable to even discern why the machine learning system detected a potential issue in the network. For this reason, many users have shied away from machine learning systems that automatically initiate corrective measures for any detected issues. In addition, there are many problems that are unsolvable across a variety of domains using traditional machine learning, such as those that lead to combinatorial explosions issues.

In contrast to traditional machine learning, cognitive learning seeks to replicate how a human 'thinks' and perceives the world. This includes the ability to learn through experience and reasoning, as well as the ability to model causality and make inferences that traditional machine learning cannot. Since cognitive systems also operate much closer to how a human being thinks, their conclusions are also much more explainable to a user.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
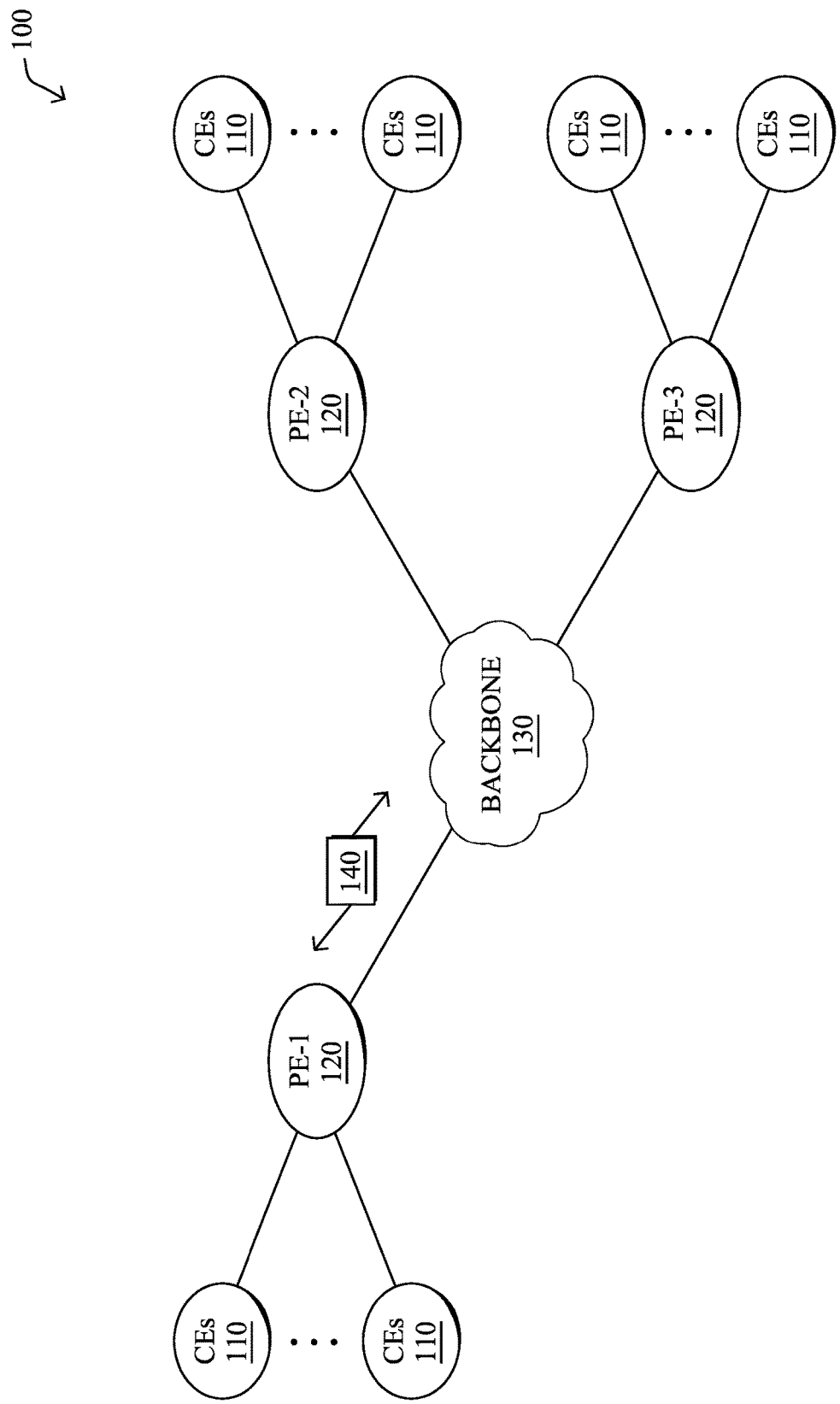
FIGS. 1A-1B illustrate an example computer network.

According to one or more embodiments of the disclosure, a device maintains a metamodel that describes a monitored system. The metamodel comprises a plurality of layers ranging from a sub-symbolic space to a symbolic space. The device tracks updates to the metamodel over time. The device updates the metamodel based in part on sub-symbolic time series data generated by the monitored system. The device receives, from a learning agent, a request for the updates to a particular layer of the metamodel associated with a specified time period. The device provides, to the learning agent, data indicative of one or more updates to the particular layer of the metamodel associated with the specified time period.

Description

A computer network is a geographically distributed collection of nodes interconnected by communication links and segments for transporting data between end nodes, such as personal computers, cellular phones, workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to forward data from one network to another.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN utilizing a Service Provider network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.
2.) Site Type B: a site connected to the network using two MPLS VPN links (e.g., from different Service Providers) using a single CE router, with potentially a backup link (e.g., a 3G/4G/5G/LTE connection). A site of type B may itself be of different types:
2a.) Site Type B1: a site connected to the network using two MPLS VPN links (e.g., from different Service Providers), with potentially a backup link (e.g., a 3G/4G/5G/LTE connection).
2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.
2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
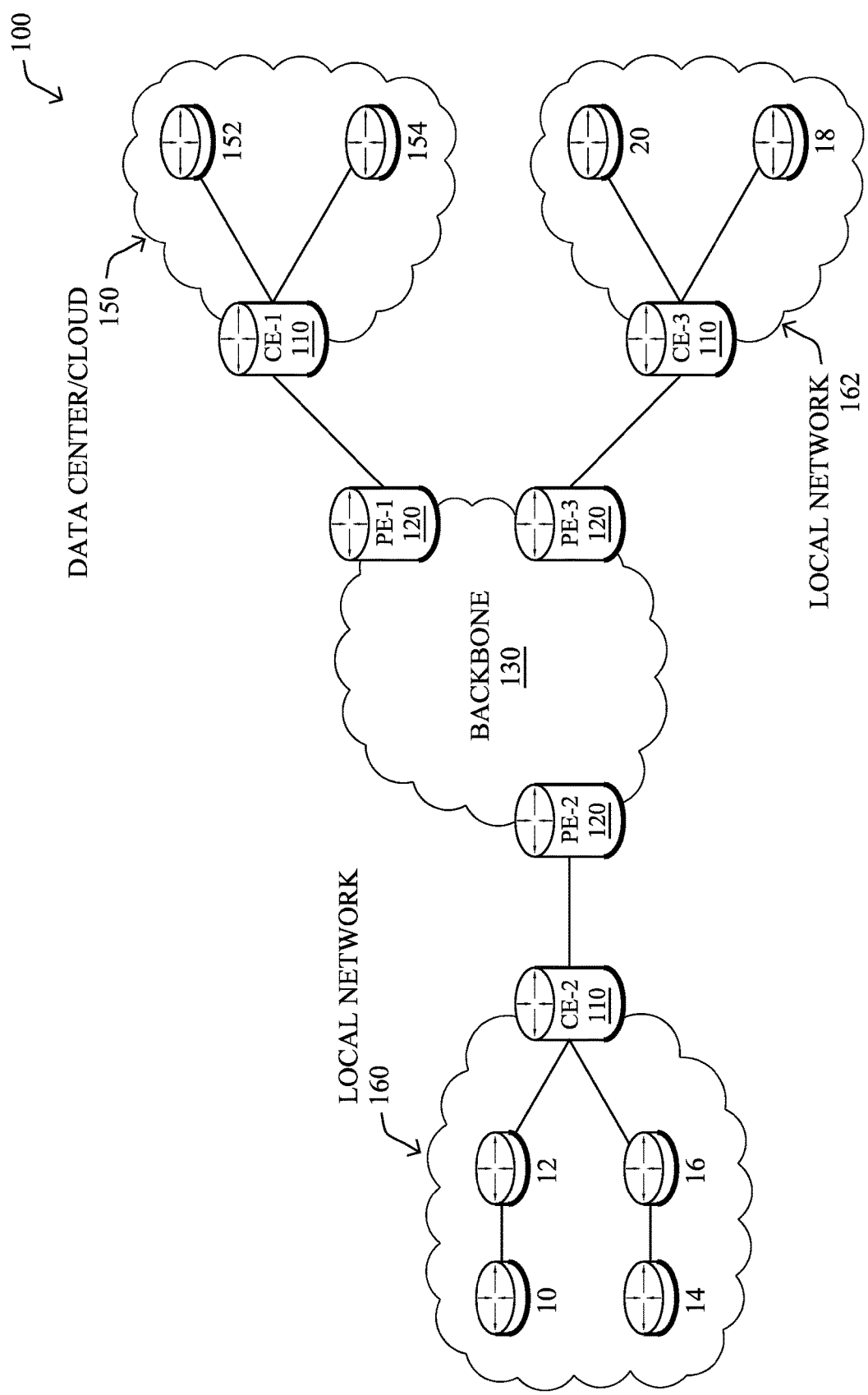

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often deployed on what are referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
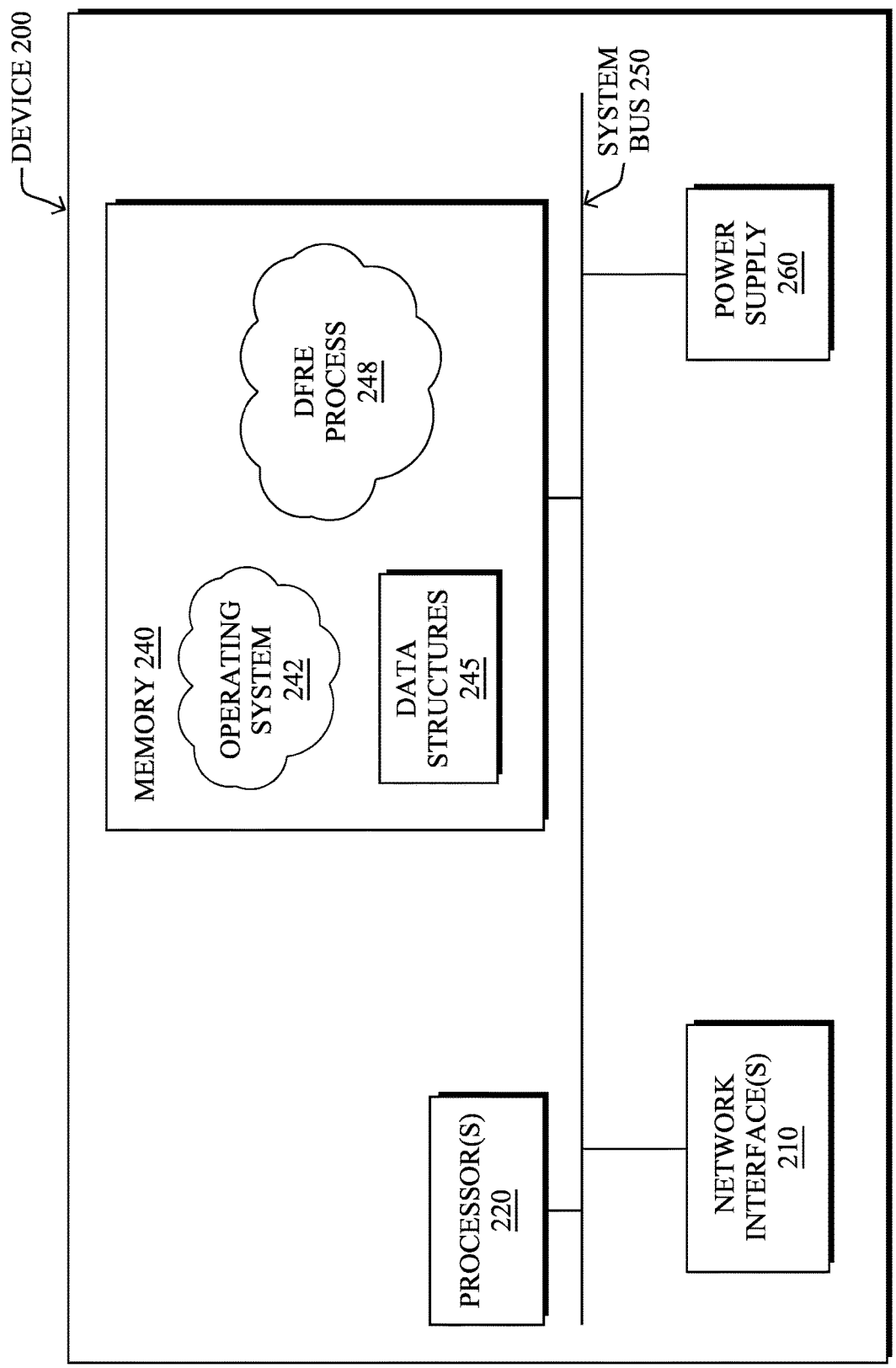
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a deep fusion reasoning engine (DFRE) process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

DFRE process 248 includes computer executable instructions that, when executed by processor(s) 220, cause device 200 to provide cognitive reasoning services to a network. In various embodiments, DFRE process 248 may utilize machine learning techniques, in whole or in part, to perform its analysis and reasoning functions. In general, machine learning is concerned with the design and the development of techniques that take as input empirical data (such as network statistics and performance indicators) and recognize complex patterns in these data. One very common pattern among machine learning techniques is the use of an underlying model M, whose hyper-parameters are optimized for minimizing the cost function associated to M, given the input data. The learning process then operates by adjusting the hyper-parameters such that the number of misclassified points is minimal. After this optimization phase (or learning phase), the model M can be used very easily to classify new data points. Often, M is a statistical model, and the minimization of the cost function is equivalent to the maximization of the likelihood function, given the input data.

In various embodiments, DFRE process 248 may employ one or more supervised, unsupervised, or self-supervised machine learning models. Generally, supervised learning entails the use of a training large set of data, as noted above, that is used to train the model to apply labels to the input data. For example, in the case of video recognition and analysis, the training data may include sample video data that depicts a certain object and is labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Self-supervised is a representation learning approach that eliminates the pre-requisite requiring humans to label data. Self-supervised learning systems extract and use the naturally available relevant context and embedded metadata as supervisory signals. Self-supervised learning models take a middle ground approach: it is different from unsupervised learning as systems do not learn the inherent structure of data, and it is different from supervised learning as systems learn entirely without using explicitly-provided labels.

Example machine learning techniques that DFRE process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) artificial neural networks (ANNs) (e.g., for non-linear models), replicating reservoir networks (e.g., for non-linear models, typically for time series), random forest classification, or the like. Accordingly, DFRE process 248 may employ deep learning, in some embodiments. Generally, deep learning is a subset of machine learning that employs ANNs with multiple layers, with a given layer extracting features or transforming the outputs of the prior layer.

The performance of a machine learning model can be evaluated in a number of ways based on the number of true positives, false positives, true negatives, and/or false negatives of the model. For example, the false positives of the model may refer to the number of times the model incorrectly identified an object or condition within a video feed. Conversely, the false negatives of the model may refer to the number of times the model failed to identify an object or condition within a video feed. True negatives and positives may refer to the number of times the model correctly determined that the object or condition was absent in the video or was present in the video, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

Figure 3:
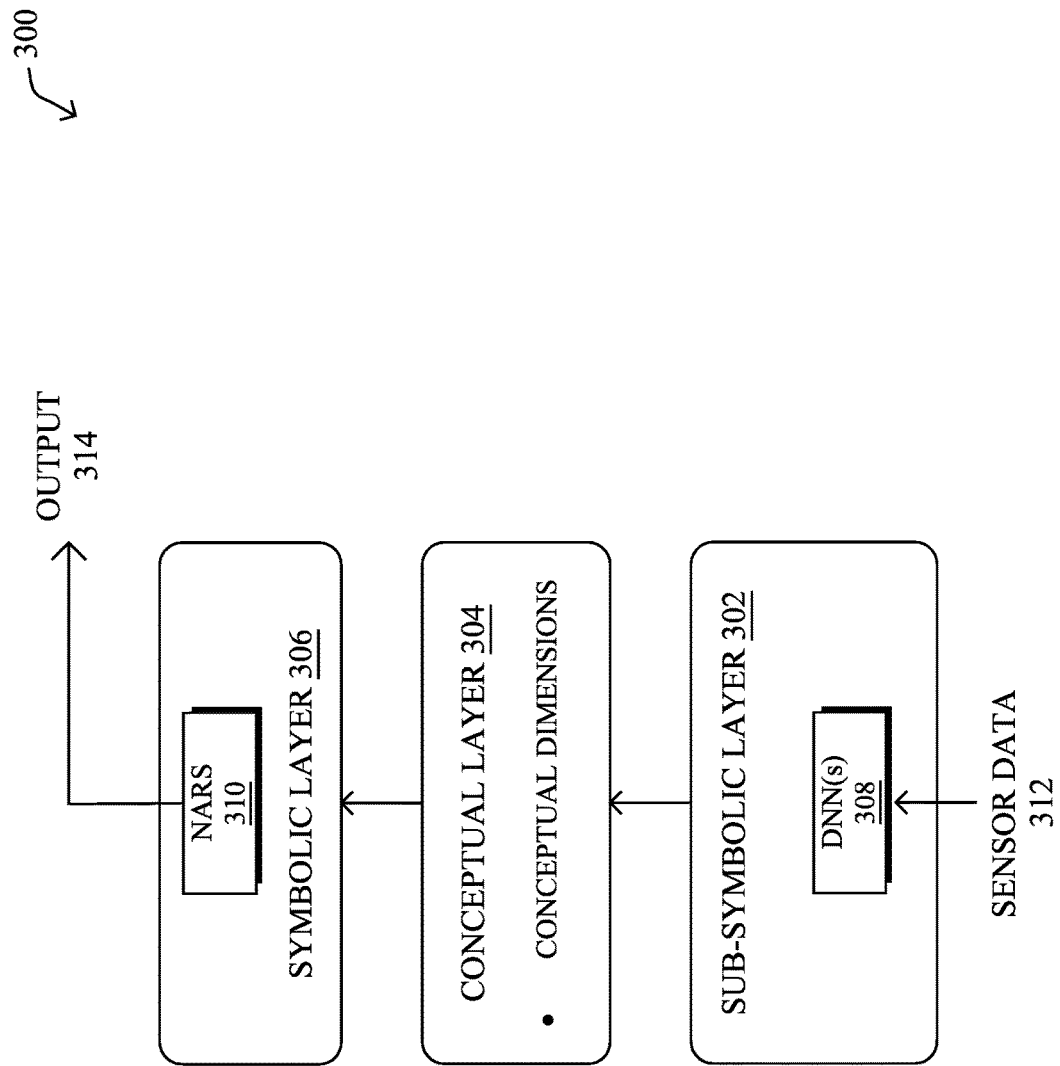
FIG. 3 illustrates an example hierarchy for a deep fusion reasoning engine (DFRE)

According to various embodiments, FIG. 3 illustrates an example hierarchy 300 for a deep fusion reasoning engine (DFRE). For example, DFRE process 248 shown in FIG. 2 may execute a DFRE for any number of purposes. In particular, DFRE process 248 may be configured to analyze sensor data in an IoT deployment (e.g., video data, etc.), to analyze networking data for purposes of network assurance, control, enforcing security policies and detecting threats, facilitating collaboration, or, as described in greater detail below, to aid in the development of a collaborative knowledge generation and learning system for visual programming.

In general, a reasoning engine, also known as a 'reasoner,' 'reasoner,' or 'rules engine,' is a specialized form of machine learning software that uses asserted facts or axioms to infer consequences, logically. Typically, a reasoning engine is a form of inference engine that applies inference rules defined via an ontology language. As introduced herein, a DFRE is an enhanced form of reasoning engine that further leverages the power of sub-symbolic machine learning techniques, such as neural networks (e.g., deep learning), allowing the system to operate across the full spectrum of sub-symbolic data all the way to the symbolic level.

At the lowest layer of hierarchy 300 is sub-symbolic layer 302 that processes the sensor data 312 collected from the network. For example, sensor data 312 may include video feed/stream data from any number of cameras located throughout a location. In some embodiments, sensor data 312 may comprise multimodal sensor data from any number of different types of sensors located throughout the location. At the core of sub-symbolic layer 302 may be one or more DNNs 308 or other machine learning-based model that processes the collected sensor data 312. In other words, sub-symbolic layer 302 may perform sensor fusion on sensor data 312 to identify hidden relationships between the data.

At the opposing end of hierarchy 300 may be symbolic layer 306 that may leverage symbolic learning. In general, symbolic learning includes a set of symbolic grammar rules specifying the representation language of the system, a set of symbolic inference rules specifying the reasoning competence of the system, and a semantic theory containing the definitions of "meaning." This approach differs from other learning approaches that try to establish generalizations from facts as it is about reasoning and extracting knowledge from knowledge. It combines knowledge representations and reasoning to acquire ground knowledge from observations in a non-axiomatic way. In other words, in sharp contrast to the sub-symbolic learning performed in layer 302, the symbolic learning and generalized intelligence performed at symbolic layer 306 requires a variety of reasoning and learning paradigms that more closely follows how humans learn and are able to explain why a particular conclusion was reached.

Symbolic learning models what are referred to as "concepts," which comprise a set of properties. Typically, these properties include an "intent" and an "extent," whereby the intent offers a symbolic way of identifying the extent of the concept. For example, consider the intent that represents motorcycles. The intent for this concept may be defined by properties such as "having two wheels" and "motorized," which can be used to identify the extent of the concept (e.g., whether a particular vehicle is a motorcycle).

Linking sub-symbolic layer 302 and symbolic layer 306 may be conceptual layer 304 that leverages conceptual spaces. In general, conceptual spaces are a proposed framework for knowledge representation by a cognitive system on the conceptual level that provides a natural way of representing similarities. Conceptual spaces enable the interaction between different type of data representations as an intermediate level between sub-symbolic and symbolic representations.

More formally, a conceptual space is a geometrical structure which is defined by a set of quality dimensions to allow for the measurement of semantic distances between instances of concepts and for the assignment of quality values to their quality dimensions, which correspond to the properties of the concepts. Thus, a point in a conceptual space S may be represented by an n-dimensional conceptual vector $v=<d_1, \ldots, d_i, \ldots, d_n>$ where $d_i$ represents the quality value for the $i^{th}$ quality dimension. For example, consider the concept of taste. A conceptual space for taste may include the following dimensions: sweet, sour, bitter, and salty, each of which may be its own dimension in the conceptual space. The taste of a given food can then be represented as a vector of these qualities in a given space (e.g., ice cream may fall farther along the sweet dimension than that of peanut butter, peanut butter may fall farther along the salty dimension than that of ice cream, etc.). By representing concepts within a geometric conceptual space, similarities can be compared in geometric terms, based on the Manhattan distance between domains or the Euclidean distance within a domain in the space. In addition, similar objects can be grouped into meaningful conceptual space regions through the application of clustering techniques, which extract concepts from data (e.g., observations).

Said differently, a conceptual space is a framework for representing information that models human-like reasoning to compose concepts using other existing concepts. Note that these representations are not competing with symbolic or associationistic representations. Rather, the three kinds can be seen as three levels of representations of cognition with different scales of resolution and complementary. Namely, a conceptual space is built up from geometrical representations based on a number of quality dimensions that complements the symbolic and deep learning models of symbolic layer 306 and sub-symbolic layer 302, representing an operational bridge between them. Each quality dimension may also include any number of attributes, which present other features of objects in a metric subspace based on their measured quality values. Here, similarity between concepts is just a matter of metric distance between them in the conceptual space in which they are embedded.

In other words, a conceptual space is a geometrical representation which allows the discovery of regions that are physically or functionally linked to each other and to abstract symbols used in symbolic layer 306, allowing for the discovery of correlations shared by the conceptual domains during concepts formation. For example, an alert prioritization module may use connectivity to directly acquire and evaluate alerts as evidence. Possible enhancements may include using volume of alerts and novelty of adjacent (spatially/temporally) alerts, to tune level of alertness.

In general, the conceptual space at conceptual layer 304 allows for the discovery of regions that are naturally linked to abstract symbols used in symbolic layer 306. The overall model is bi-directional as it is planned for predictions and action prescriptions depending on the data causing the activation in sub-symbolic layer 302.

Layer hierarchy 300 shown is particularly appealing when matched with the attention mechanism provided by a cognitive system that operates under the assumption of limited resources and time-constraints. For practical applications, the reasoning logic in symbolic layer 306 may be non-axiomatic and constructed around the assumption of insufficient knowledge and resources (AIKR). It may be implemented, for example, with a Non-Axiomatic Reasoning System (open-NARS) 310. However, other reasoning engines can also be used, such as Auto-catalytic Endogenous Reflective Architecture (AERA), OpenCog, and the like, in symbolic layer 306, in further embodiments. Even Prolog may be suitable, in some cases, to implement a reasoning engine in symbolic layer 306. In turn, an output 314 coming from symbolic layer 306 may be provided to a user interface (UI) for review. For example, output 314 may comprise a video feed/stream augmented with inferences or conclusions made by the DFRE, such as the locations of unstocked or under-stocked shelves, etc.

By way of example of symbolic reasoning, consider the ancient Greek syllogism: (1.) All men are mortal, (2.) Socrates is a man, and (3.) therefore, Socrates is mortal. Depending on the formal language used for the symbolic reasoner, these statements can be represented as symbols of a term logic. For example, the first statement can be represented as "man→[mortal]" and the second statement can be represented as "{Socrates}→man." Thus, the relationship between terms can be used by the reasoner to make inferences and arrive at a conclusion (e.g., "Socrates is mortal"). Non-axiomatic reasoning systems (NARS) generally differ from more traditional axiomatic reasoners in that the former applies a truth value to each statement, based on the amount of evidence available and observations retrieved, while the latter relies on axioms that are treated as a baseline of truth from which inferences and conclusions can be made.

In other words, a DFRE generally refers to a cognitive engine capable of taking sub-symbolic data as input (e.g., raw or processed sensor data regarding a monitored system), recognizing symbolic concepts from that data, and applying symbolic reasoning to the concepts, to draw conclusions about the monitored system.

Cognitive Automation for Networking, Security, IoT, and Collaboration

The techniques herein introduce a cognitive automation framework that supports edge to cloud distributed heterogenous compute environments that can coalesce and summarize knowledge across the entire system. In various embodiments, the framework may provide any or all of the following:

A versatile system that can solve problems previously considered unsolvable in a wide variety of domains due to an unprecedented ability to generalize and automatically deal with combinatorial explosion issues.

Data fusion across different levels of abstraction ranging from sub-symbolic to multiple levels of symbolic abstraction.

Experience based learning by reasoning.

Richer knowledge representation than machine learning, deep learning, rules engines, and programming languages can provide.

The ability to handle tail events.

Explainable decisions.

The ability to go beyond statistical learning limitations with causal modeling and inference.

Illustratively, the techniques described herein may be performed by hardware, software, and/or firmware, such as in accordance with the DFRE process 248, which may include computer executable instructions executed by the processor 220 (or independent processor of interfaces 210), to perform functions relating to the techniques described herein.

Specifically, according to various embodiments, a device maintains a metamodel that describes a monitored system. The metamodel comprises a plurality of layers ranging from a sub-symbolic space to a symbolic space. The device tracks updates to the metamodel over time. The device updates the metamodel based in part on sub-symbolic time series data generated by the monitored system. The device receives, from a learning agent, a request for the updates to a particular layer of the metamodel associated with a specified time period. The device provides, to the learning agent, data indicative of one or more updates to the particular layer of the metamodel associated with the specified time period.

Figure 4:
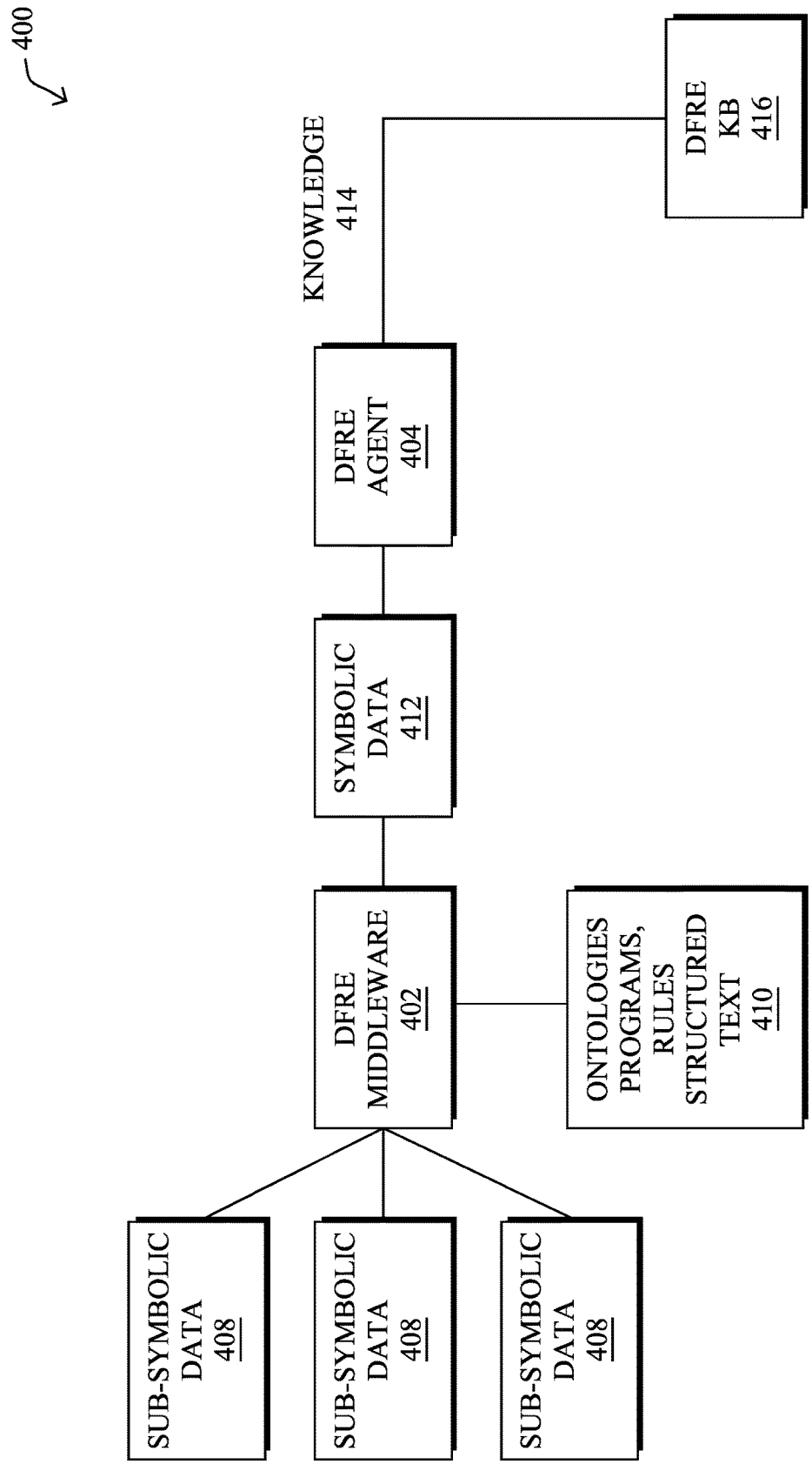
FIG. 4 illustrates an example DFRE architecture.

Operationally, according to various embodiments, FIG. 4 illustrates an example DFRE architecture 400. As shown, architecture 400 may be implemented across any number of devices or fully on a particular device, as desired. At the core of architecture 400 may be DFRE middleware 402 that offers a collection of services, each of which may have its own interface. In general, DFRE middleware 402 may leverage a library for interfacing, configuring, and orchestrating each service of DFRE middleware 402.

In various embodiments, DFRE middleware 402 may also provide services to support semantic reasoning, such as by an AIKR reasoner. For example, as shown, DFRE middleware 402 may include a NARS agent that performs semantic reasoning for structural learning. In other embodiments, OpenCog or another suitable AIKR semantic reasoner could be used.

One or more learning agents, such as DFRE agents 404, may interface with DFRE middleware 402 to orchestrate the various services available from DFRE middleware 402. In addition, DFRE agent 404 may feed and interact with the AIKR reasoner so as to populate and leverage a DFRE knowledge graph with knowledge.

More specifically, in various embodiments, DFRE middleware 402 may obtain sub-symbolic data 408. In turn, DFRE middleware 402 may leverage various ontologies, programs, rules, and/or structured text 410 to translate sub-symbolic data 408 into symbolic data 412 for consumption by DFRE agent 404. This allows DFRE agent 404 to apply symbolic reasoning to symbolic data 412, to populate and update a DFRE knowledge base (KB) 416 with knowledge 414 regarding the problem space (e.g., the network under observation, etc.). In addition, DFRE agent 404 can leverage the stored knowledge 414 in DFRE KB 416 to make assessments/inferences.

For example, DFRE agent 404 may perform semantic graph decomposition on DFRE KB 416 (e.g., a knowledge graph), so as to compute a graph from the knowledge graph of KB 416 that addresses a particular problem. DFRE agent 404 may also perform post-processing on DFRE KB 416, such as performing graph cleanup, applying deterministic rules and logic to the graph, and the like. DFRE agent 404 may further employ a definition of done, to check goals and collect answers using DFRE KB 416.

In general, DFRE KB 416 may comprise any or all of the following:
Data
Ontologies
Evolutionary steps of reasoning
Knowledge (e.g., in the form of a knowledge graph)
The Knowledge graph also allows different reasoners to:
  Have their internal subgraphs
  a Share or coalesce knowledge
  Work cooperatively In other words, DFRE KB 416 acts as a dynamic and generic memory structure. In some embodiments, DFRE KB 416 may also allow different reasoners to share or coalesce knowledge, have their own internal sub-graphs, and/or work collaboratively in a distributed manner. For example, a first DFRE agent 404 may perform reasoning on a first subgraph, a second DFRE agent 404 may perform reasoning on a second sub-graph, etc., to evaluate the health of the network and/or find solutions to any detected problems. To communicate with DFRE agent 404, DFRE KB 416 may include a bidirectional Narsese interface or other interface using another suitable grammar.

In various embodiments, DFRE KB 416 can be visualized on a user interface. For example, Cytoscape, which has its building blocks in bioinformatics and genomics, can be used to implement graph analytics and visualizations.

Said differently, DFRE architecture 400 may include any or all of the following the following components:
DFRE middleware 402 that comprises:
  Structural learning component
  JSON, textual data, ML/DL pipelines, and/or other containerized services (e.g., using Docker)
  Hierarchical goal support
DFRE Knowledge Base (KB) 416 that supports:
  Bidirectional Narsese interface
  Semantic graph decomposition algorithms
  Graph analytics
  Visualization services
DFRE Agent 404
  DFRE Control System
More specifically, in some embodiments, DFRE middleware 402 may include any or all of the following:
Sub-symbolic services:
  Data services to collect sub-symbolic data for consumption
Reasoner(s) for structural learning
NARS
OpenCog
Optimized hierarchical goal execution
  Probabilistic programming
  Causal inference engines
Visualization Services (e.g., Cytoscape, etc.)

DFRE middleware 402 may also allow the addition of new services needed by different problem domains.

Figure 5:
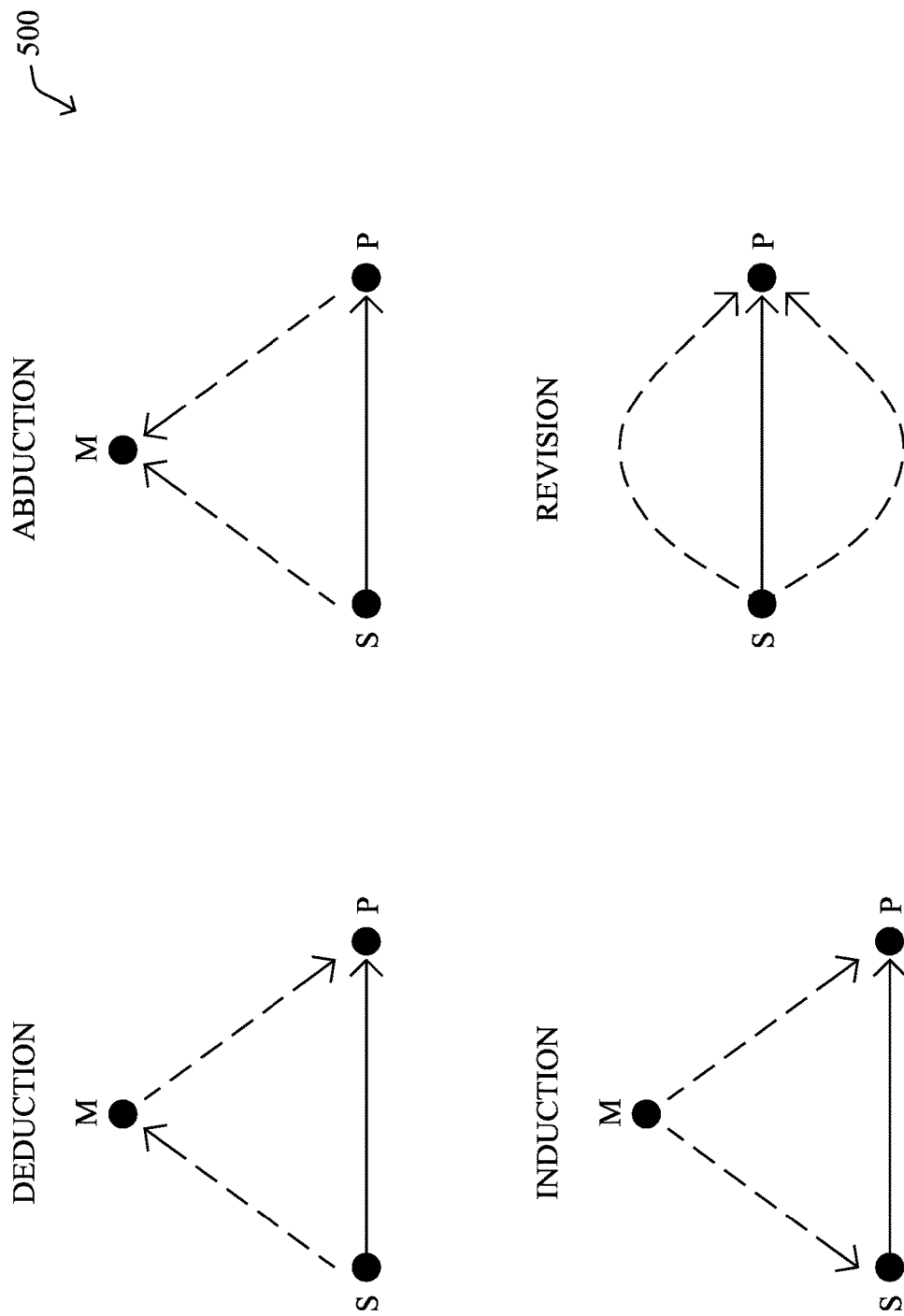
FIG. 5 illustrates an example of various inference types.
Figure 6:
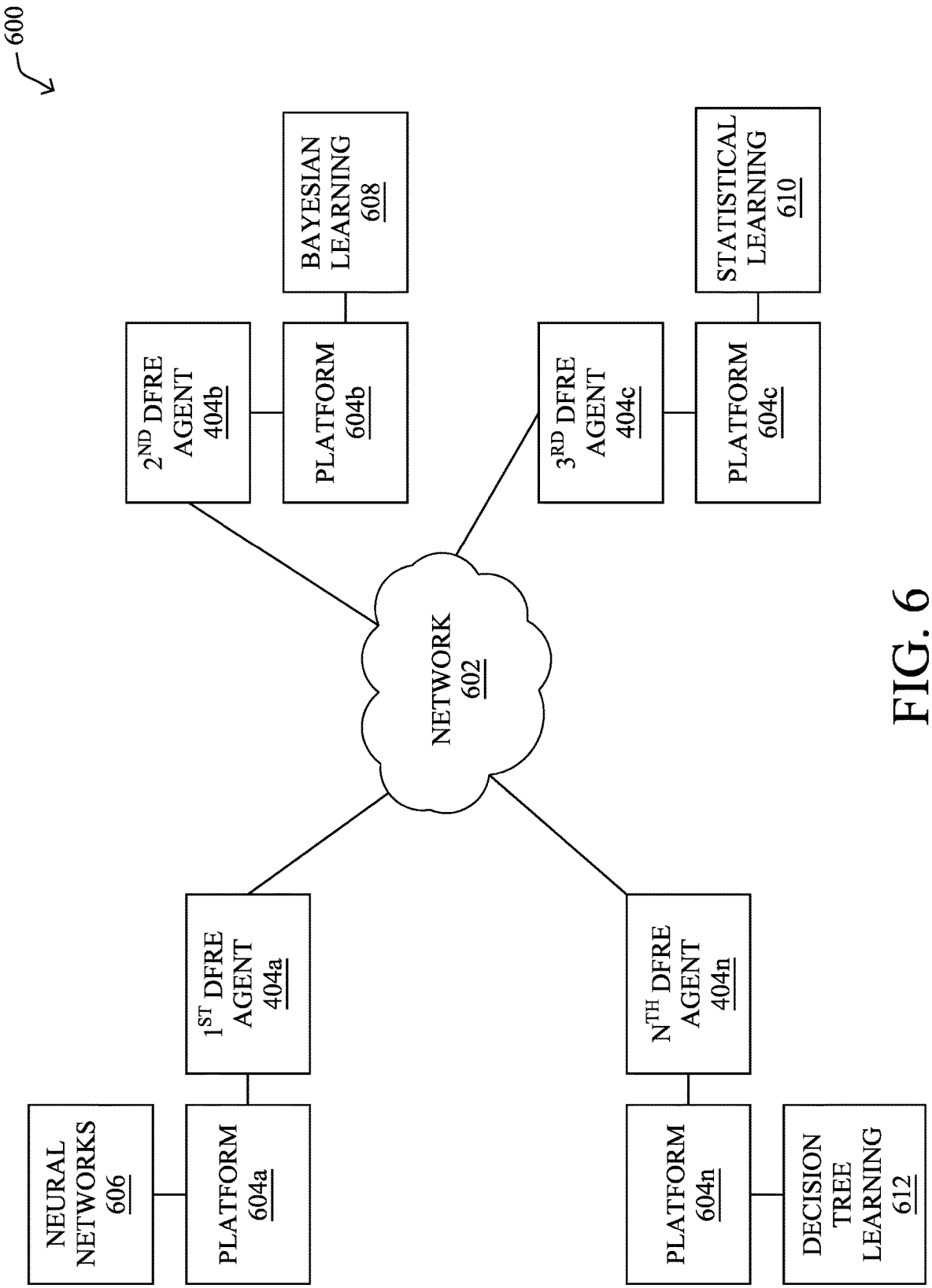
FIG. 6 illustrates an example architecture for multiple DFRE agents.

During execution, DFRE agent 404 may, thus, perform any or all of the following:
Orchestration of services
Focus of attention
  Semantic graph decomposition
    Addresses combinatorial issues via an automated divide and conquer approach that works even in non-separable problems because the overall knowledge graph 416 may allow for overlap.
  Feeding and interacting with the AIKR reasoner via bidirectional translation layer to the DFRE knowledge graph.
  Call middleware services
Post processing of the graph
  Graph clean-up
  Apply deterministic rules and logic to the graph
Definition of Done (DoD)
  Check goals and collect answers FIG. 5 illustrates an example 500 showing the different forms of structural learning that the DFRE framework can employ. More specifically, the inference rules in example 500 relate premises S→M and M→P, leading to a conclusion S→P. Using these rules, the structural learning herein can be implemented using an ontology with respect to an Assumption of Insufficient Knowledge and Resources (AIKR) reasoning engine, as noted previously. This allows the system to rely on finite processing capacity in real time and be prepared for unexpected tasks. More specifically, as shown, the DFRE may support any or all of the following:
Syllogistic Logic
  Logical quantifiers
Various Reasoning Types
  Deduction Induction
  Abduction
  Induction
  Revision
Different Types of Inference
Local inference
Backward inference To address combinatorial explosion, the DFRE knowledge graph may be partitioned such that each partition is processed by one or more DFRE agents 404, as shown in FIG. 6, in some embodiments. More specifically, any number of DFRE agents 404 (e.g., a first DFRE agent 404a through an $N^{th}$ DFRE agent 404n) may be executed by devices connected via a network 602 or by the same device. In some embodiments, DFRE agents 404a-404n may be deployed to different platforms (e.g., platforms 604a-604n) and/or utilize different learning approaches. For instance, DFRE agent 404a may leverage neural networks 606, DFRE agent 404b may leverage Bayesian learning 608, DFRE agent 404c may leverage statistical learning, and DFRE agent 404n may leverage decision tree learning 612.

As would be appreciated, graph decomposition can be based on any or all of the following:
Spatial relations—for instance, this could include the vertical industry of a customer, physical location (country) of a network, scale of a network deployment, or the like.
Descriptive properties, such as severity, service impact, next step, etc.
Graph-based components (isolated subgraphs, minimum spanning trees, all shortest paths, strongly connected components . . . )

Any new knowledge and related reasoning steps can also be input back to the knowledge graph, in various embodiments.

In further embodiments, the DFRE framework may also support various user interface functions, so as to provide visualizations, actions, etc. to the user. To do so, the framework may leverage Cytoscape, web services, or any other suitable mechanism.

Figure 7:
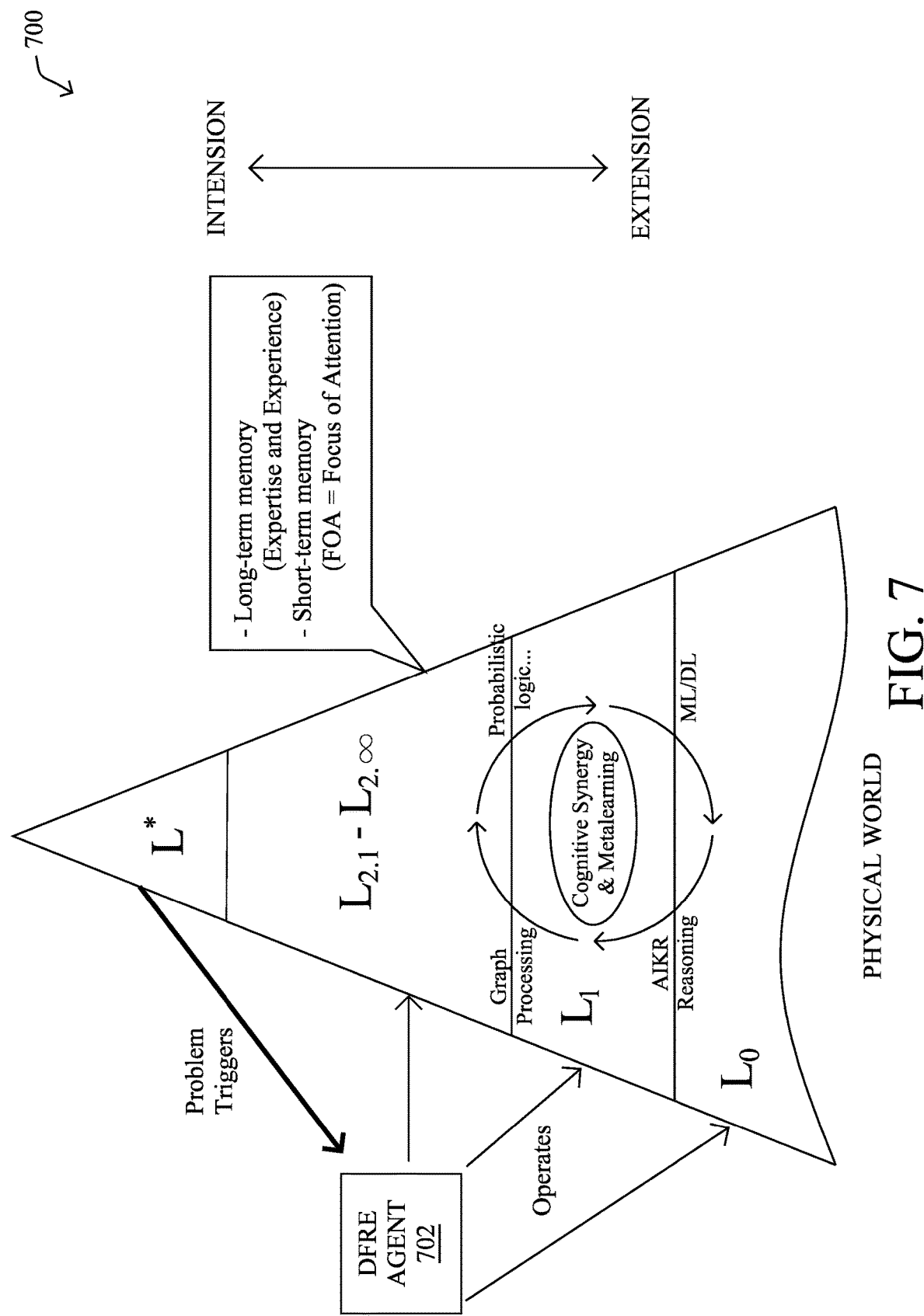
FIG. 7 illustrates an example DFRE metamodel.

At the core of the techniques herein is a knowledge representation metamodel 700 for different levels of abstraction, as shown in FIG. 7, according to various embodiments. In various embodiments, the DFRE knowledge graph groups information into four different levels, which are labeled $L_0$, $L_1$, $L_2$, and $L^*$ and represent different levels of abstraction, with $L_0$ being closest to raw data coming in from various sensors and external systems and $L_2$ representing the highest levels of abstraction typically obtained via mathematical means such as statistical learning and reasoning. $L^*$ can be viewed as the layer where high-level goals and motivations are stored. The overall structure of this knowledge is also based on anti-symmetric and symmetric relations.

One key advantage of the DFRE knowledge graph is that human level domain expertise, ontologies, and goals are entered at the $L_2$ level. This can lead, by definition, to an unprecedented ability to generalize at the $L_2$ level thus minimizing the manual effort required to ingest domain expertise.

More formally:
- $L^*$ represents the overall status of the abstraction. In case of a problem, it triggers problem solving in lower layers via a DFRE agent 702.
- $L_{2.1}$-$L_{2.\infty}$=Higher level representations of the world in which most of concepts and relations are collapsed into simpler representations. The higher-level representations are domain-specific representations of lower levels.
- $L_1$=has descriptive, teleological and structural information about $L_0$.
- $L_0$=Object level is the symbolic representation of the physical world.

In various embodiments, $L_2$ may comprise both expertise and experience stored in long-term memory, as well as a focus of attention (FOA) in short-term memory. In other words, when a problem is triggered at $L^*$, a DFRE agent 702 that operates on $L_2$-$L_0$ may control the FOA so as to focus on different things, in some embodiments.

As would be appreciated, there may be hundreds of thousands or even millions of data points that need to be extracted at $L_0$. The DFRE's FOA is based on the abstraction and the DFRE knowledge graph (KG) may be used to keep combinatorial explosion under control.

Said differently, metamodel 700 may generally take the form of a knowledge graph in which semantic knowledge is stored regarding a particular system, such as a computer network and its constituent networking devices. By representing the relationships between such real-world entities (e.g., router A, router B, etc.), as well as their more abstract concepts (e.g., a networking router), DFRE agent 702 can make evaluations regarding the particular system at different levels of extraction. Indeed, metamodel 700 may differ from a more traditional knowledge graph through the inclusion of any or all of the following, in various embodiments:
- A formal mechanism to represent different levels of abstraction, and for moving up and down the abstraction hierarchy (e.g., ranging from extension to intension).
- Additional structure that leverages distinctions/anti-symmetric relations, as the backbone of the knowledge structures.
- Similarity/symmetric relation-based relations.

The DFRE framework introduced herein can be applied to many different use cases across a large variety of monitored systems. Indeed, preliminary testing has applied the techniques herein to the following use cases, among others, with reproducible success:
- Arcade game playing—in this use case, the objective was to understand the differential learning rate and the ability to generalize over state-of-the-art deep learning techniques. Testing has shown that the DFRE-based cognitive framework introduced herein was able to learn to play games in less than 20 plays versus thousands of plays for deep Q-learning. In addition, once the game was learned, the system generalized well as demonstrated by handling without retraining, gameplay changes such as paddle size, colors, obstacles, and other behaviors. This is in sharp contrast to existing reinforcement learning (RL) approaches which require significant retraining.
- Transportation Safety—The DFRE-based cognitive framework introduced herein was also adapted for use in a smart city using deep fusion for object identification and tracking. In doing so, the framework was able to automatically learn transportation scene semantics such as the locations of roads, sidewalks, crosswalks, etc., as well as behaviors such as normal interactions between vehicles and pedestrians. This learning was achieved in an unsupervised manner and over a very short amount of time (e.g., several minutes). in a couple minutes and once learned generate alerts when jay walking, speeding, and other potentially dangerous events occur. A distributed version of this scenario was also implemented and demonstrated that the DFRE cognitive framework can serve as the foundation of a federated artificial intelligence (AI) system that also features strong cumulative learning capabilities.
- Retail Inventory—Another prototype implementing the techniques herein was created that was able to detect the locations of shelves, products on shelves, and product groups in an unsupervised manner with very high accuracy and ability to generalize. In all cases that involved shelves and items on shelves, the system performed at human level without any additional training.
- Workload Balancing/Edge Computing—In further instances, the techniques herein can also be used to optimize the workload placement in a distributed computing environment, such as among edge computing devices. For instance, the DFRE cognitive framework herein can be used to autonomously (e.g., in an unsupervised manner) create models that are descriptive and predictive of the capabilities of compute nodes, such as in terms of available memory, disk space, CPU, network resources, etc. In addition, the resource requirements of different applications could also be predicted, allowing the system to identify the optimal locations for execution of the applications.

As would be appreciated, the above examples are illustrative in nature and one skilled in the art can adapt the DFRE-based framework herein to assess any number of different scenarios.

Figure 8A:
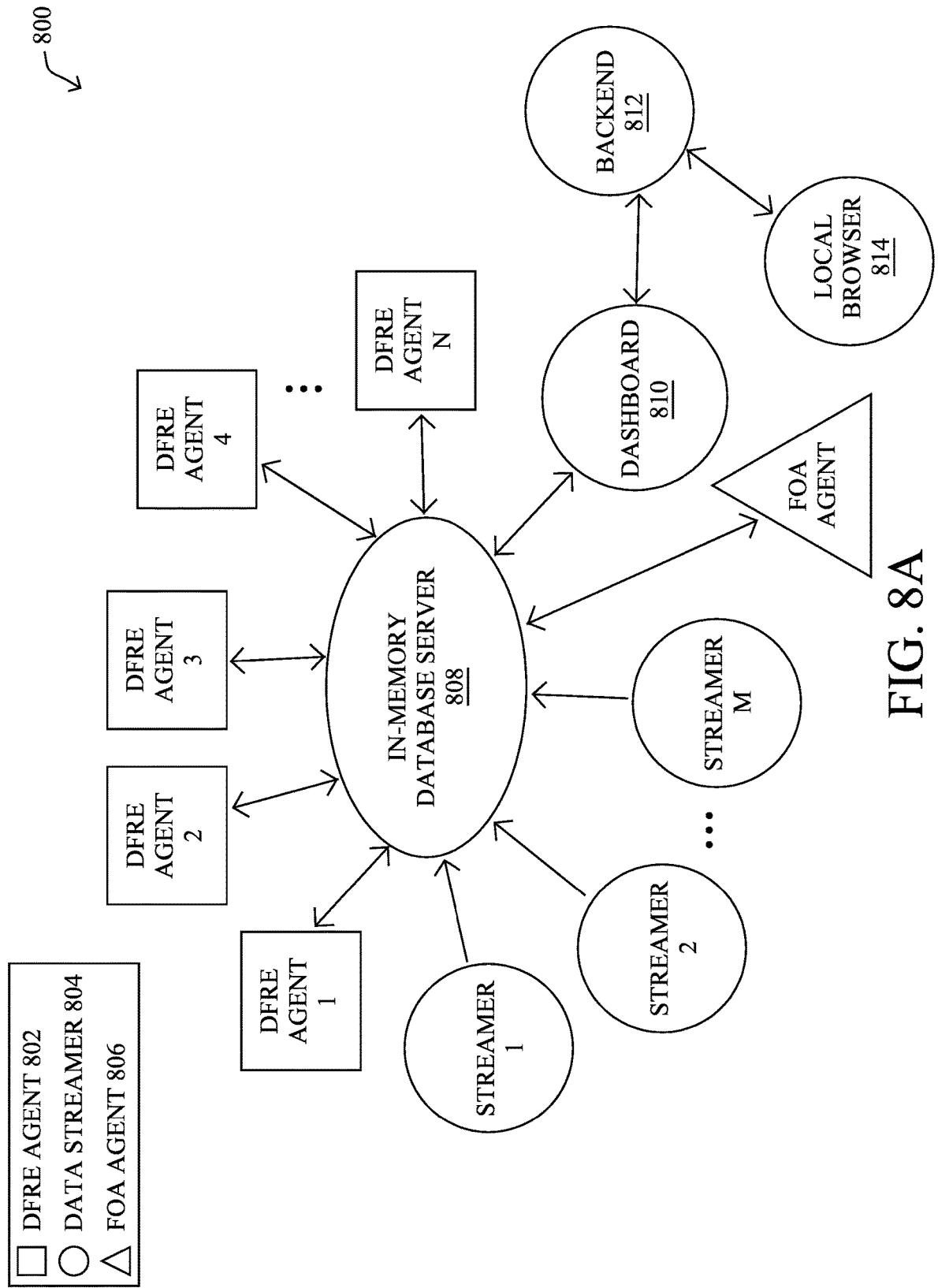
FIGS. 8A-8B illustrate examples of DFRE agents collaborating with respect to an event.

FIG. 8A illustrates an example network architecture 800 for federated artificial intelligence with cumulative learning, according to various embodiments. As shown, architecture 800 may include any or all of the following components: a plurality of DFRE agents 802 (e.g., a first through N-number of DFRE agents), a plurality of data streamers 804 (e.g., a first through M-number of data streamers), a focus of attention (FOA) agent 806, an in-memory database server 808, a dashboard agent 810, a visualization backend 812, and a browser 814. As would be appreciated, components 802-814 may be implemented in a federated manner across any number of physical devices in the network. In further cases, some of components 802-814 may also reside external to the local network. For example, FOA agent 806, database server 808, dashboard agent 810, backend 812, and/or browser 814 may be executed on one or more remote devices, such as in the cloud, a data center, or the like. In addition, any of components 802-814 may implement any of the functionalities described previously with respect to architectures 400-400a and the framework in example 500.

In general, each data streamer 804 may be a source of sensor data in the network. For example, in the case of a surveillance system, each data streamer 804 may correspond to a different camera that generates video stream data at different physical locations. More generally, architecture 800 can be implemented for any number of use cases to assess sensor data generated at various locations in the network. Accordingly, data streamers 804 may be any form of device that takes measurements in the network. For example, in the case of architecture 800 providing network assurance to the network, data streamers 804 may include network telemetry exporters that capture and export telemetry data regarding the operation of the network (e.g., resource consumptions, link state information, etc.).

As the core of architecture 800 may be in-memory database server 808 that functions as a fast, in-memory, key-value datastore for use as a database, cache, message broker, and/or queue. For example, in-memory database server 808 may be a Redis, RabitMQ, or kafka server, or other suitable storage and messaging platform that implements a publish/subscribe messaging paradigm whereby senders (publishers) are not programmed to send their messages to specific listeners (subscribers). On the contrary, messages published to server 808 may be characterized into channels, without a publisher knowing which listeners (subscribers) exist or are available. Listeners express interest in one or more channels, and only receive messages that are of interest. This decoupling of publishers and subscribers can allow for greater scalability and a more dynamic network topology.

Located in network 800 may be any number of DFRE agents 802 that are configured to assess sensor data captured by data stramers 804. In various embodiments, each DFRE agent 802 may have a corresponding set of one or more data streamers 804 from which it receives and analyzes sensor data. This can be achieved, for example, by each data streamer 804 publishing its sensor data to database server 808 and its corresponding DFRE agent 802 listening for these messages. By publishing the sensor data to different channels, the sensor data can be partitioned to form pairs of one or more data streamers 804 and one or more DFRE agents 802.

According to various embodiments, each DFRE agent 802 may maintain its own knowledge base and use semantic reasoning to make inferences about the sensor data that it receives from its associated data streamer(s) 804 via the messages published to server 808. For example, in some embodiments, each DFRE agent 802 may transform the sub-symbolic sensor data from its corresponding data streamer(s) 804 into symbolic data, either locally, or leveraging an intermediate service. In turn, the DFRE agent 504 may use its knowledge base (e.g., an ontology) and an AIKR reasoner to apply symbolic reasoning to the symbolic data, to make inferences about the sensor data.

Also as shown, architecture 800 may also include FOA agent 806 that is responsible for providing a sensor-motor control and attention mechanism for the DFRE agents 802 in architecture 800. For example, FOA agent 806 may subscribe to messages published by DFRE agents 802 to database server 80. Thus, when a DFRE agent 802 indicates that a particular event has occurred, FOA agent 806 may assess the published event, determine a FOA suitable for the event, and publish instructions to other DFRE agents 802 via database server 808, accordingly.

Another key functionality of architecture 800 is the ability for a user to quickly visualize the inferences made by DFRE agents 802, as well as the chain of reasoning that led to these inferences. To this end, architecture 800 may also include a dashboard agent 810 that provides visualization data to a browser 814 via backend 812. For example, visualization data may be provided to browser 814 via Graphite, a utility that allows visualization of time-series data, StatsD, a daemon that aggregates statistics/metrics, or any other suitable visualization utilities.

As would be appreciated, each DFRE agent 802 may have its own objective reality in the domain of interest (domain knowledge) and knowledge about how to use the domain knowledge to achieve various goals (problem-solving knowledge). Accordingly, the knowledge bases of each DFRE agent 802 may be initiated using a seed ontology that triggers the reasoning process and represents information, so as to define the meaning of terms and their relationships in a consistent manner across architecture 800. Doing so allows the DFRE agents 802 to share a common mode of communication and allow for bootstrapping the cognitive system on a specific scenario.

To enable cumulative learning and data sharing between the various DFRE agents 802, DFRE agents 802 may share acquired knowledge with one another by publishing messages to server 808 and subscribing to messages published by other DFRE agents 802 of interest. In general, cumulative learning involves three phases: 1.) acquiring new knowledge models, 2.) evaluating the performance of existing ones, and 3.) controlling the learning activity.

Acquiring new knowledge models is pattern extraction and entails identifying causal relationships between input pairs. Model acquisition is triggered by either the unpredicted success of a goal, or the failure of a prediction. For example, assume that DFRE agent 1 shown makes a new inference regarding its input sensor data using its reasoning engine and may update its knowledge base, accordingly.

Once the DFRE agent 802 has produced a model, it may monitor the performance of the new model. If the model is unreliable, the DFRE agent 802 may delete the unreliable model. Otherwise, the DFRE agent 802 may share its acquired knowledge with other DFRE agents 802 in network 800 and update its own knowledge base, accordingly.

Finally, both model acquisition and revision control depend on the limited resources that can be allocated and may be driven by the reasoning system so as to optimize their operations. As a result, the system is forced by design to continuously learn, based on its experience, about its progress in modeling inputs.

As a use case example, assume that data streamers 804 are video cameras located throughout a smart city, each camera generating its own video stream and publishing that feed to database server 808. In turn. DFRE agents 802 (e.g., executed on routers or other devices in the network) may receive the video streams to which they are subscribed from server 808. Now, assume that DFRE agent 1 shown analyzes the video stream using is semantic reasoner and makes an inference that a hit-and-run event has occurred (i.e., an event of interest).

To track the hit-and-run driver throughout the city, DFRE agent 1 may publish the inference as a message to database server 808. In turn, FOA agent 806, which is subscribed to the channel to which the message was published, will learn that a hit-and-run even has occurred. In turn. FOA agent 806 may identify the responsible video in the initial video and make the vehicle the focus of attention for other DFRE agents 804 by publishing a message to database server 808. For example, such a message may indicate the initial inference that a hit-and-run has occurred, information that can be used to help identify the vehicle, etc. As a result, other DFRE agents 802 may update their knowledge bases and begin looking for the vehicle in the video streams from their associated data streams 804. In doing so, the hit-and-run vehicle can be tracked by the DFRE agents 802 across the various camera views available throughout the city. In addition, dashboard agent 810 may also provide the video streams in which the vehicle was detected to browser 814, allowing a user to continue to track the whereabouts of the vehicle.

Note that various approaches are possible with respect to implementing cumulative learning in architecture 800. In a simple case, a brute force approach can be used whereby all now inferences by DFRE agents 802 are publish and coalesced. However, this may not scale well in some implementations, but can still be useful in smaller networks.

In another embodiment, the DFRE agents 802 may employ an intermediate approach whereby a DFRE agent 802 uses a computed metric to filter out the publication of certain inferences. For example, a DFRE agent 802 may compute the length of the chain of reasoning associated with the inference and compare it to a threshold. If the length exceeds the threshold, the DFRE agent 802 may suppress reporting the inference to database server 808. Conversely, if the length is below the threshold, the DFRE agent 802 may determine that the inference should be propagated to the other DFRE agents 802 (and to FOA agent 806), accordingly.

In a further embodiment, the DFRE agent 802 may determine a class of event associated with its inference determine whether to propagate the inference to other DFRE agents 802 based on the class. This can be achieved by using a common seed ontology across the DFRE agents 802, so that they can recognize the different event types at a high level. In other cases, the DFRE agent 802 may publish the inference to a channel that coincides with the determined class of event, allowing the different agents to subscribe only to events of interest.

Figure 8B:
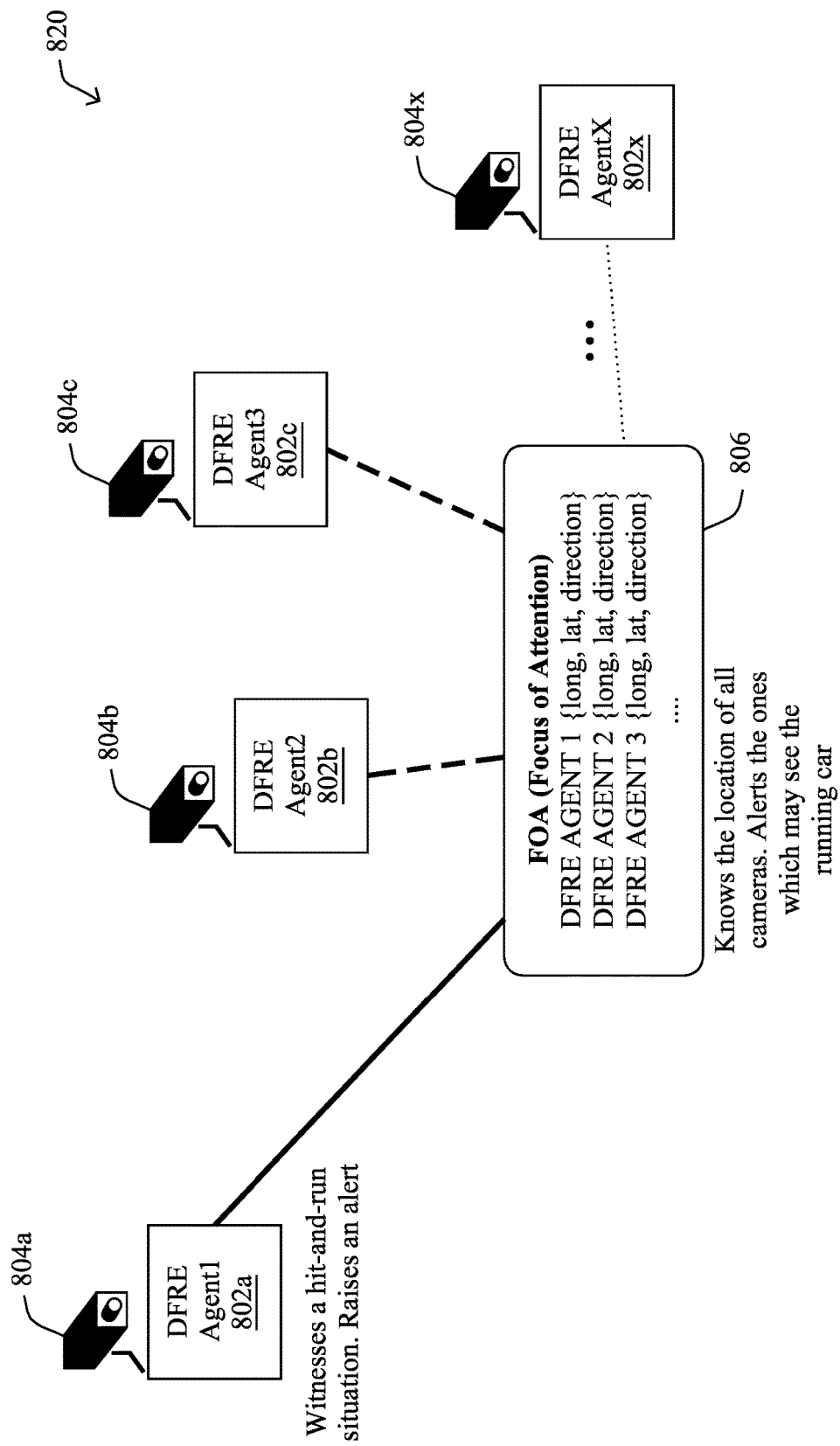

FIG. 8B illustrates an example 820 of a DFRE cognitive framework being used to assess traffic via a plurality of cameras (e.g., sensors) deployed to a physical area. Each year, approximately 1.25 million people die in road traffic crashes and as many as 50 million people are injured. These numbers continue to increase at an alarming rate.

In general, transportation networks are very similar to communications networks, whereby the safe and secure delivery of people and goods is also required, similar to the delivery of packets in a communication network. In addition, both types of networks often deal with congestion, path failures, mixed media, and modes and quality of service in similar manners.

The distributed nature of transportation networks and, in particular, intersections and the push towards real-time insights into road user behavior lends itself well to solutions such as DFRE architecture herein. Indeed, architecture 800 in FIG. 8A can be implemented in a distributed network environment that enables coalescing and summarizing knowledge and represents a fully functioning, cumulative learning system. Sensors, such as video cameras and the like, may provide time-series data to the DFRE framework, which enables real-time visibility into asset performance, whether this be the location of an object on a road and understanding queue length per lane, counting the number of people waiting for a bus or on a train, and the like.

More specifically, as shown in FIG. 8B, DFRE agents 802 may be deployed for execution by devices located on roads, busses, trains, stops, other vehicles, and the like, for execution. For instance, each DFRE agent 802*a*-802*x* (e.g., a first through $x^{th}$ agent) may be executed by networking devices (e.g., routers, switches, gateways, etc.) or other computing devices and may receive video feed data from associated cameras 804*a*-804*x* (e.g., data streamers) for analysis. This can also drive intent-based networking through the acceleration of churn of existing hardware to support these solutions. In addition, assume that there is an FOA agent 806 of the framework that knows the positions of all of the cameras 804*a*-804*x*.

Assume now that camera 804*a* captures a hit and run accident. In such a case, DFRE agent 802*a* may analyze the time series of video data, to recognize this type of event. In turn, DFRE agent 802*a* may alert FOA agent 806 of the event, such as by providing information regarding the coordinates (e.g., latitude, longitude, etc.), of the hit-and-run car, its direction of travel during the event, timing information, or the like. In turn, FOA agent 806 may perform an analysis of location and (motion) of car to determine which cameras should be alerted to prioritize tracking of the vehicle associated with the hit-and-run event. Then, FOA agent 806 may activates high priority tracking on subset of cameras 804*b*-804*x*, to track the offending vehicle across multiple camera feeds. More specifically, FOA agent 806 may instruct other agents among DFRE agents 804*b*-804*x* to identify the offending vehicle and track its movement across the various video feeds.

Figure 9A:
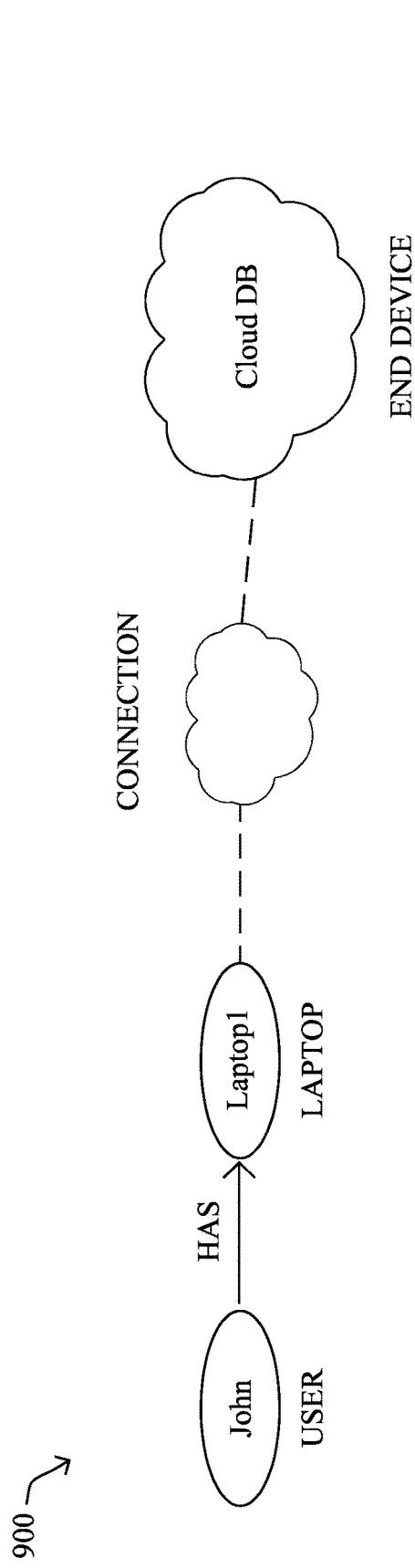
FIGS. 9A-9K illustrate examples of the use of a DFRE metamodel to diagnose a network.

In another use case for the DFRE architecture herein, assume case scenario to demonstrate the operations of the DFRE-based cognitive framework, assume now that John cannot access a cloud database from his laptop, as shown in example 900 in FIG. 9A. Although John actually has two separate connections, one of which is kept redundant in for emergency, everything between his laptop and the cloud can be simplified as shown.

As would be appreciated, different DFRE agents may be executed throughout the network (e.g., on routers, switches, etc.) and leverage a DFRE metamodel, such as the metamodel 700 shown previously in FIG. 7. First, data from the physical world is ingested and translated into DFRE KG level $L_0$ via specific translators and pre-processors dependent on the data type. The DFRE agent(s) process this data to create higher level representations in the DFRE KG Levels $L_1$ and $L_2$. Long-term memory representing expertise and prior experience at a high level of abstraction is stored in $L_2$. The control system information at $L^*$ triggers the DFRE agent to take action based on high-level goals and motivations as they pertain to the $L_2$ interpretation of the current situation. Troubleshooting can take place on the $L_2$ long-term memory, where the domain expertise and experience-based networking knowledge is stored.

Figure 9B:
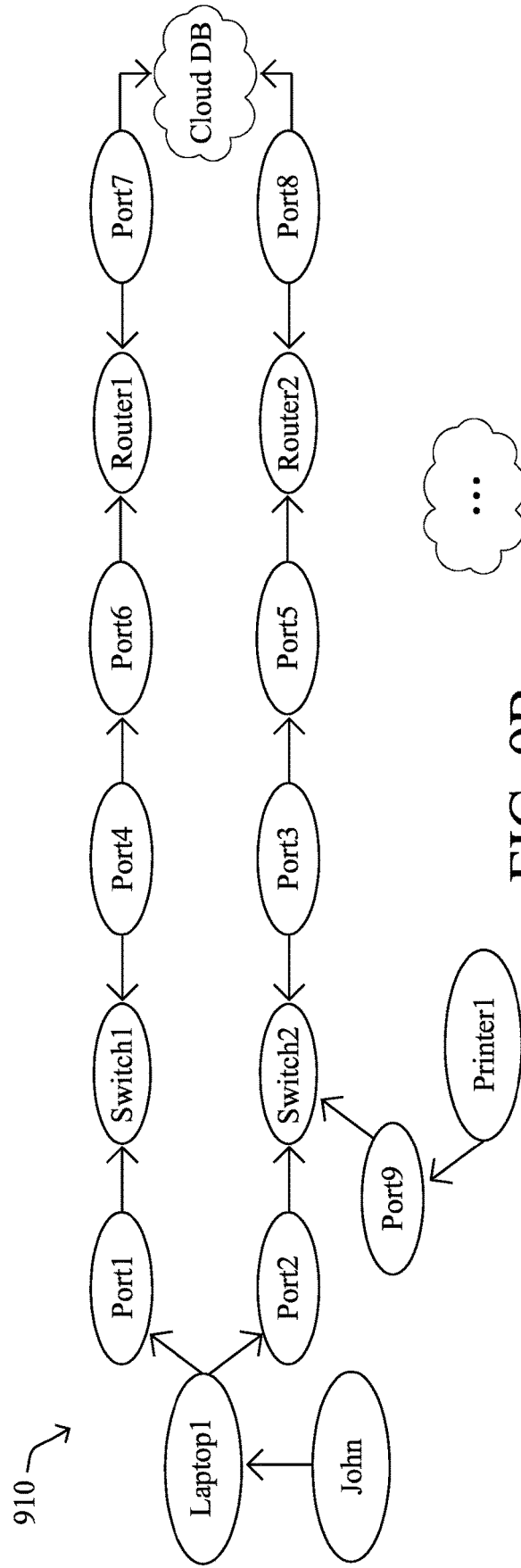

More specifically, the operation of the DFRE system deployed in the network may proceed as follows, in specific instance of John:

At step 1, Event:$L_0$ is loaded by traceroute or other command line interface (CLI). This allows the devices, topology, and user to now exist in $L_0$ of the metamodel, as shown in layer representation 910 in FIG. 9B.

Figure 9C:
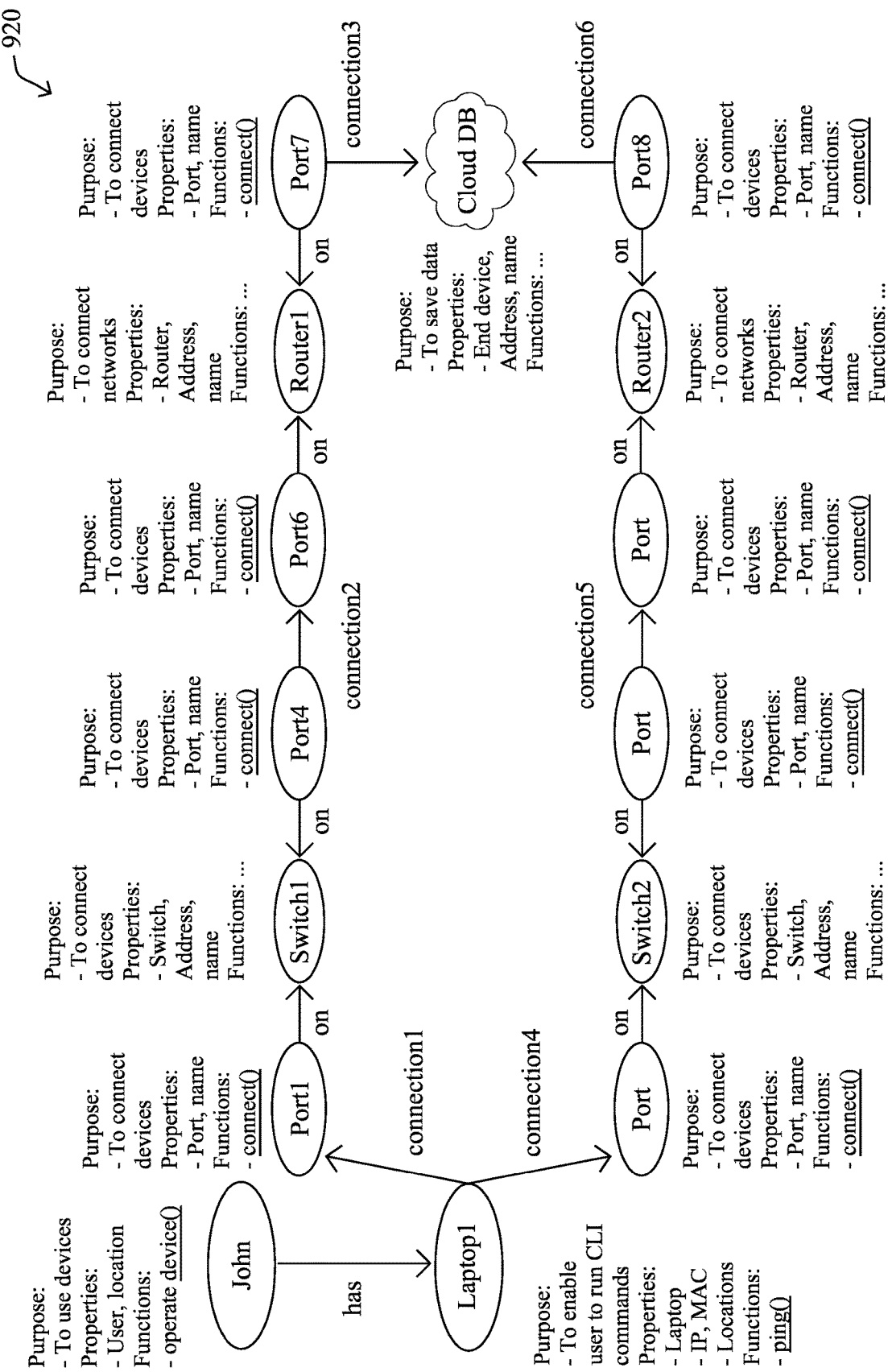

At step 2, the DFRE attempts to create $L_1$ from $L_0$ and $L_2$. Note that this can be performed by leveraging the expertise and knowledge captured by the long-term memory of $L_2$. FIG. 9C illustrates an example 920 of the resulting information at $L_1$, which holds structural information about $L_0$.

Figure 9D:
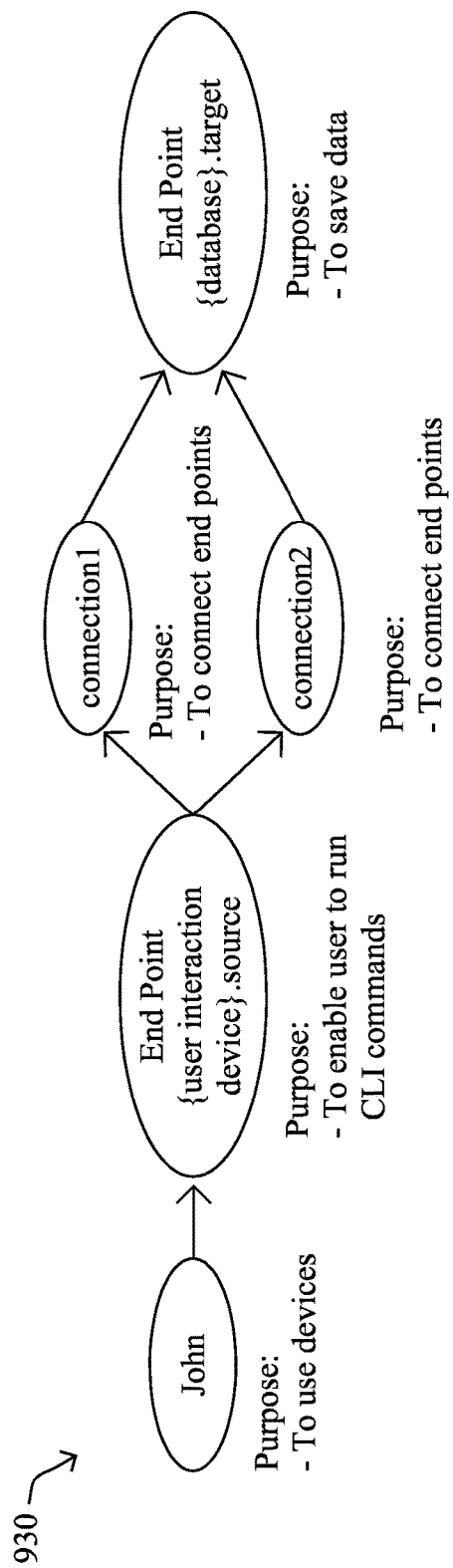

At step 3, the DFRE now generates an abstraction of $L_1$ in $L_2$. Note that this may entail creating $L_2$ short term memory/FOA via abstraction, as well. As sub-steps, the DFRE may also collapse $L_1$ nodes as follows, to perform the abstraction:

L2.laptop→L2.x→L2.end point→L2.end point.source
L2.CloudDB→L2.x→L2.end point→L2.end point.target
L2.Router→L2.x→L2.end point Then, as another substep, the DFRE may collapse $L_1$ edges between L1(L2.end point.source) and L1(L2.end point.target). To do so, the DFRE may collapse every (L1(L2.end point), L1(L2.connection), L1(L2.end point)) into L2.(L2.end point.source, L2.connection, L2.end point.target). Intermediate abstractions are also represented as $L_{2.1}$-$L_{2.\infty}$, as needed. The final L2 is shown in example 930 in FIG. 9D.

Figure 9E:
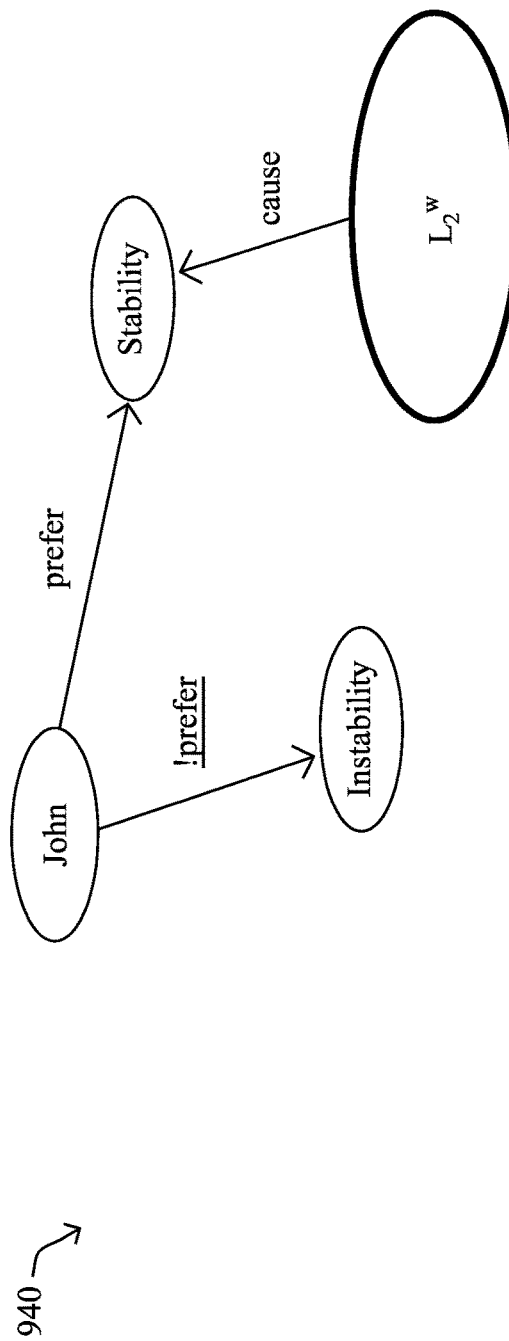

At step 4, the DFRE adds L* information to L2. At this point, there is no knowledge of malfunction, so L*(L2)= $L_2^{working}$. FIG. 9E shows an example 940 of L* that represents the overall situation of the system. Note that $L_2^w$ means working $L_2$ in FIG. 9E.

At step 5, John reports the problem, indicating that he cannot access the cloud database.

Figure 9F:
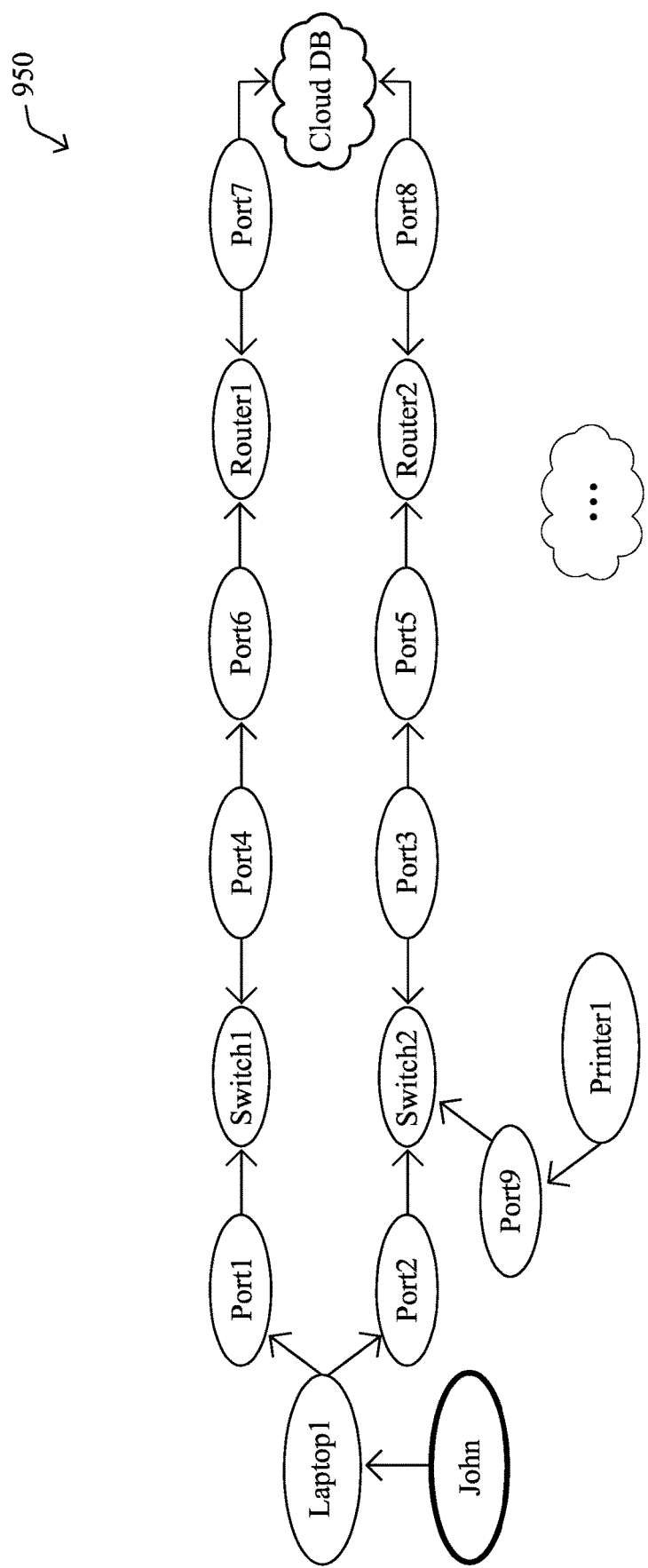

At step 6, the DFRE updates $L_0$ to indicate that the reported problem exists. For example, FIG. 9F illustrates an example 950 of the $L_0$ Level representation of the current world with the problem present.

Figure 9G:
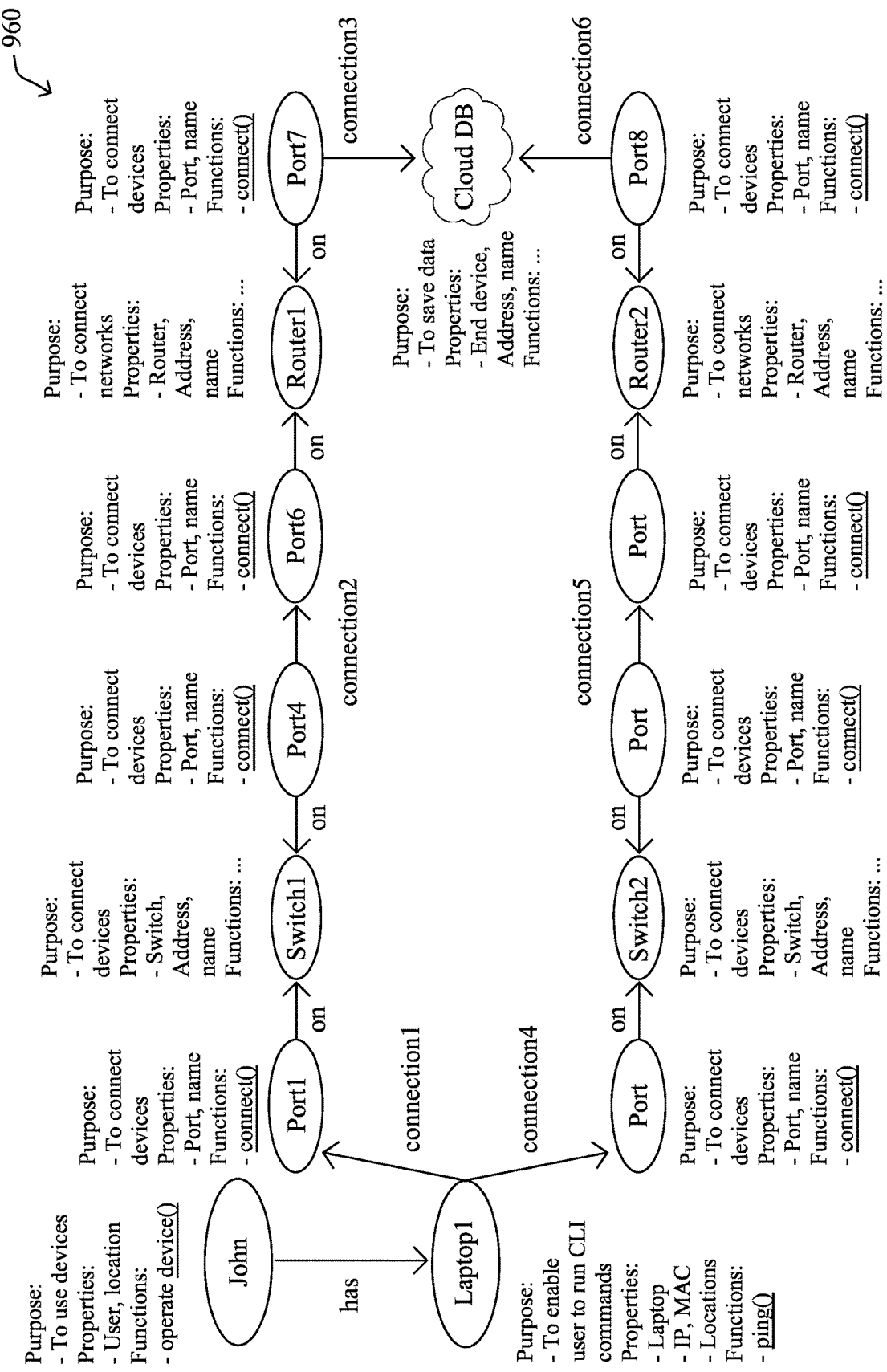
Figure 9H:
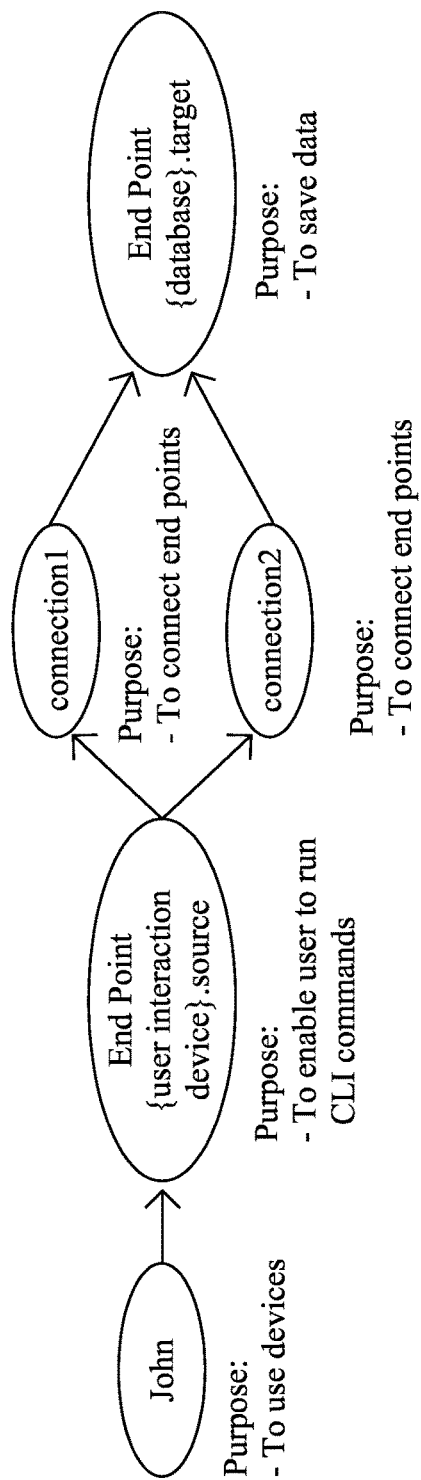
Figure 9I:
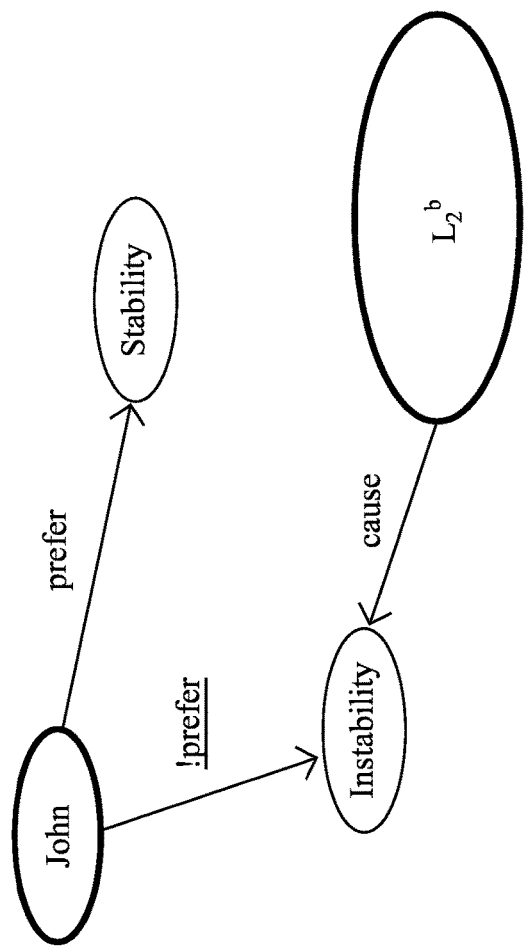

At step 7, the DFRE updates $L_1$ based on alert information, which causes updates in higher levels of the metamodel as follows:

L0(Cloud DB)=shaded→L1(Cloud DB)=shaded→L2 (end point.target)=shaded
attempt to find a path between L1.John and L1.Cloud DB
every part of the path in $L_1$ turns to shaded
the abstraction of $L_1$=$L_2$ turns to shaded
the abstraction of $L_2$=L* turns shaded The updated $L_1$ representation of the world with the problem present is shown in example 960 in FIG. 9G. Similarly, FIG. 9H show an example 970 of the updated $L_2$ representation of the world with the problem present. In addition, the updated L* is shown in example 980 in FIG. 9I. Note that $L_2^b$ means broken $L_2$ in this example.

Figure 9J:
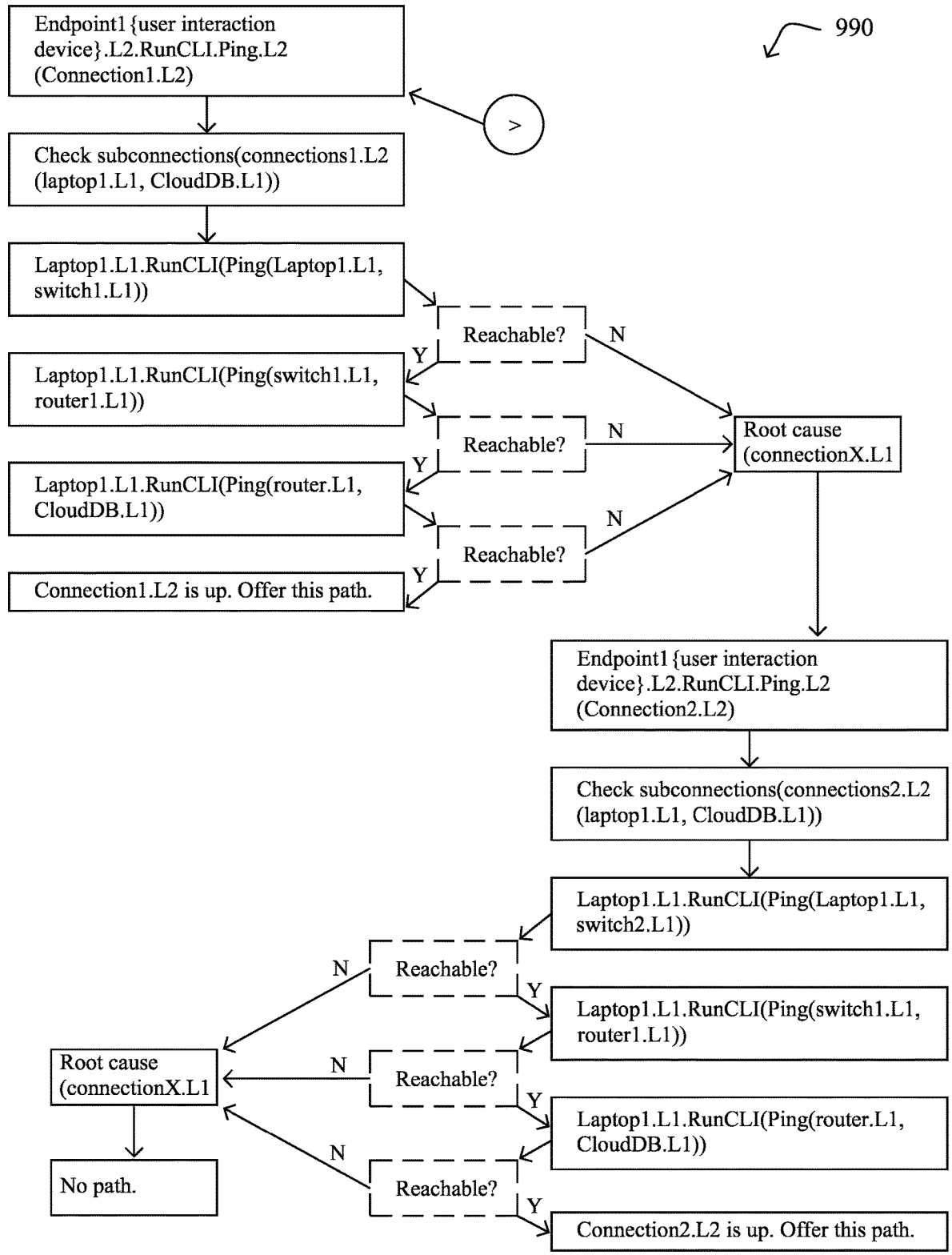
Figure 9K:
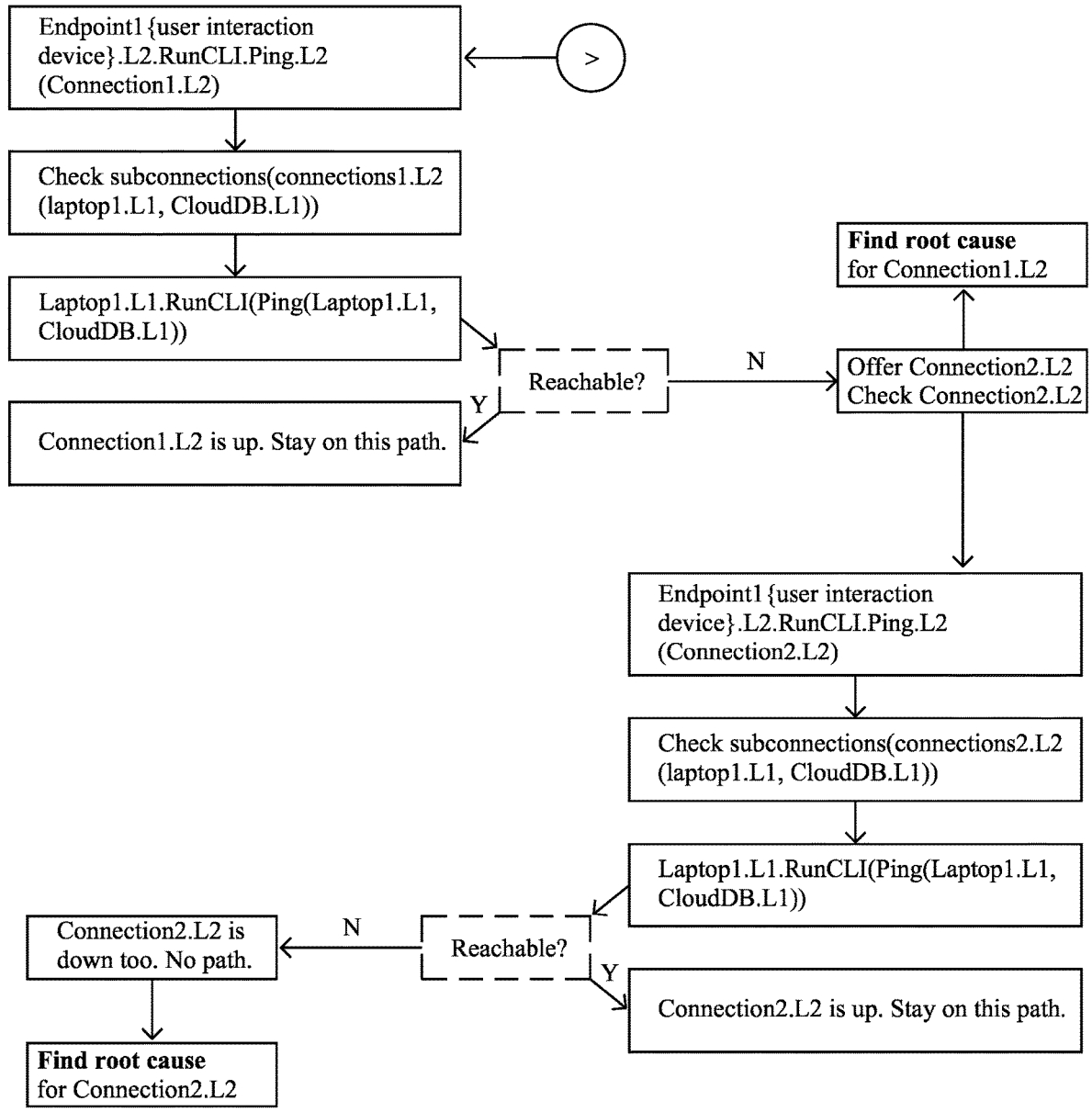

At step 8, the DFRE may identify solutions to the problem. Notably, the John and $L_2^b$ nodes in L*, as shown in example 980 in FIG. 9I, means initiate problem solving at $L_2$, due to their shading. To do so, the DFRE may leverage the troubleshooting knowledge present in the long-term memory of L2. More specifically the representation and actions may be as follows:

nodes in L1 of graph
  devices
    identify connectivity via ping on nodes in L1
      cost: 1
      contextual
      replace connection with a parallel one
        cost: 2
        contextual
      If no path, determine if HW or SW problem
        use bootable USB drive to test HW
          cost: 5
edges in $L_2$ graph
  expand connection abstraction
Determine prioritized troubleshooting options
  check connectivity to all devices in expanded path (the L2.connection1 is L1.connection1, L1.connection2, . . . )
  offer alternative connection FIG. 9J illustrates an example 990 of the automatically generated troubleshooting tree. Note, however, that this may not be as effective because suggesting using the second connection takes time. The improved troubleshooting tree 995 is shown in FIG. 9K, which can be produced by performing a search for the root cause. Thus, the system may offer the second connection, first, then start looking for the root cause of the connection failure.

At step 9, the system will attempt the solutions:
try to ping all devices in expanded path Connection1.L2
  result: everything fails
  Root cause broken connection is found.
try to ping all devices in expanded path Connection2.L2
  result: this path works
  Alternative paths are offered.

Figure 10A:
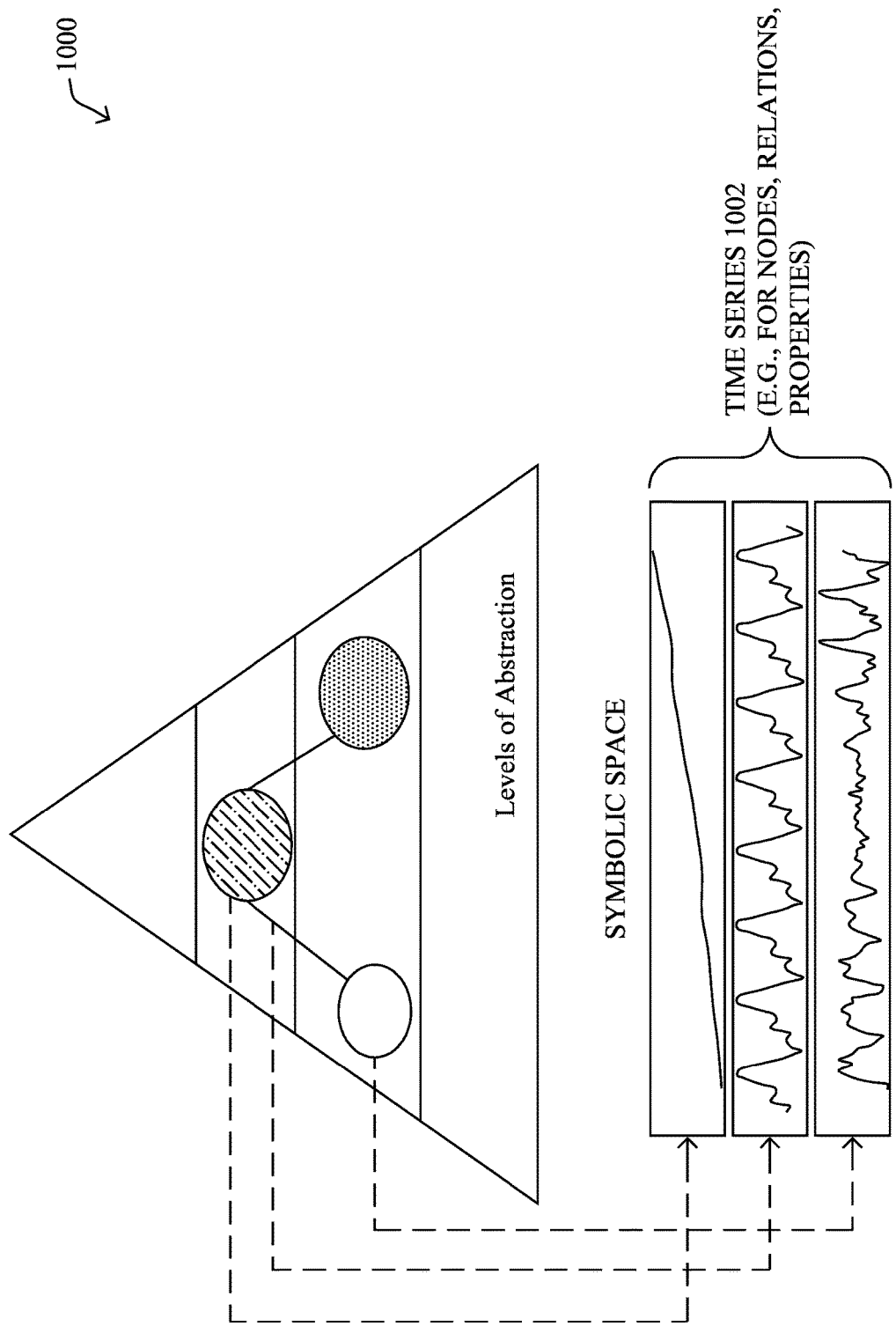
FIGS. 10A-10C illustrate examples of a temporal metamodel for use in a DFRE architecture.
Figure 10B:
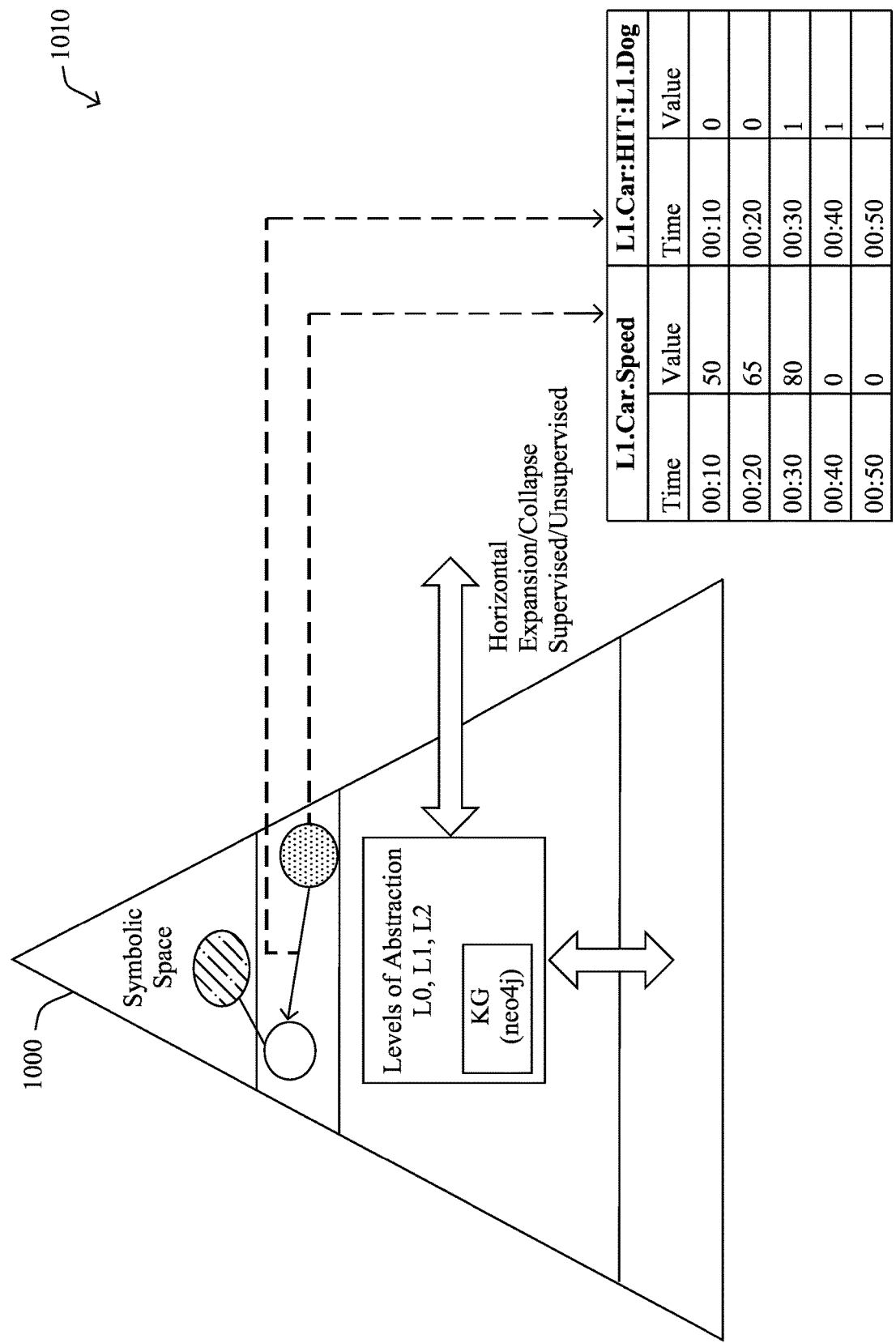
Figure 10C:
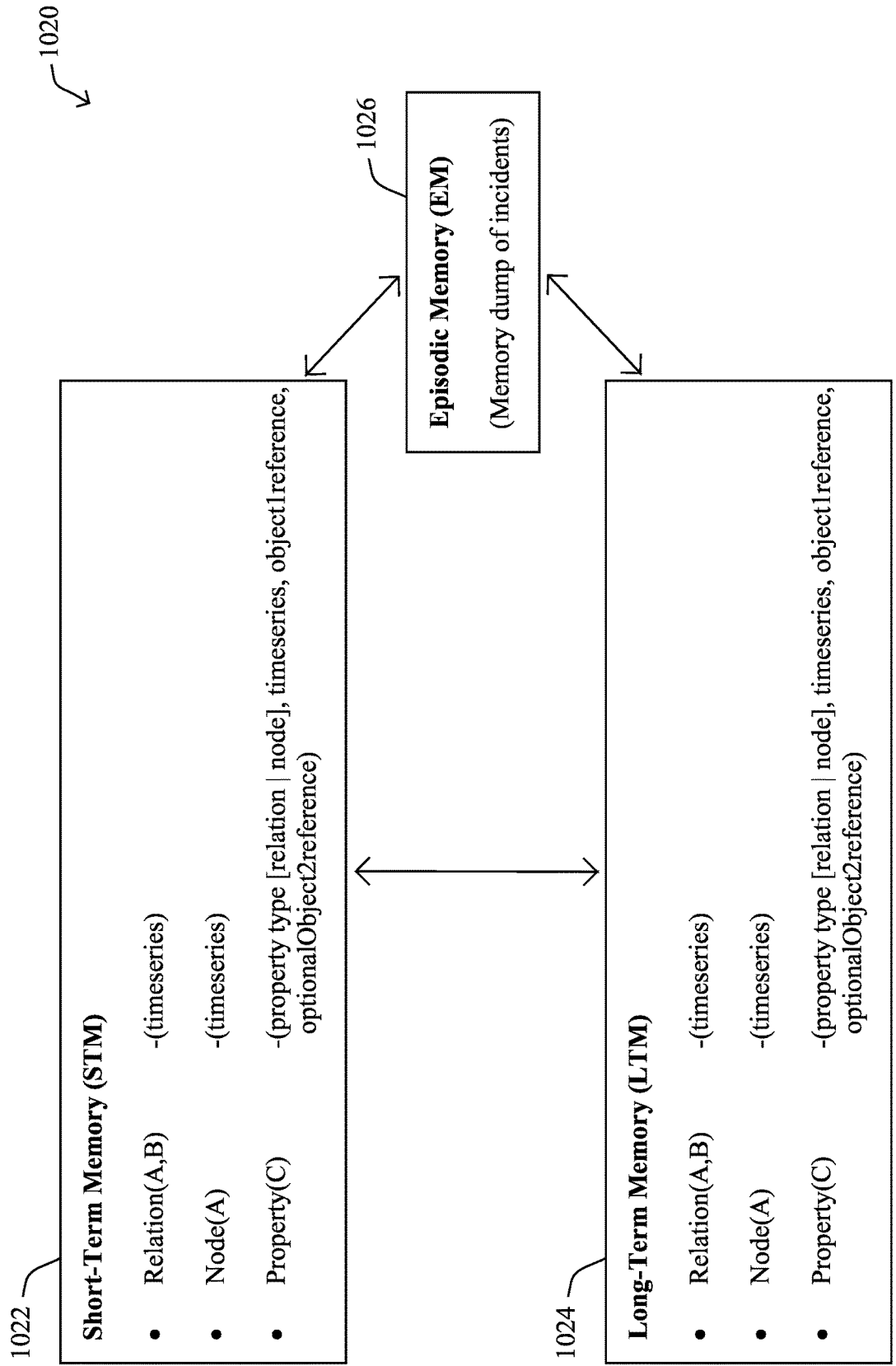

FIGS. 10A-10C illustrate examples of a temporal metamodel 1000 for use in a DFRE architecture, according to various embodiments. In various embodiments, metamodel 700 described previously in FIG. 7 may be extended with temporal capabilities, thereby forming a temporal metamodel, such as temporal metamodel 1000. More specifically, in addition to ingesting sub-symbolic data and using its layers of abstraction to perform cognitive at its highest layers, temporal metamodel 1000 may also maintain time series data 1002 for its nodes, relations, and properties (e.g., those in the knowledge graph). In other words, temporal metamodel 1000 may also keep track of any updates to temporal metamodel 1000 over time, such as those that result from changes in the monitored system, temporal metamodel 1000 learning new concepts, or the like.

One potential use case for temporal metamodel 1000 is to control the placement of workloads in a distributed computing system. For instance, edge devices that share computing workloads may leverage temporal metamodel 1000 to optimize the executing location of a particular application or other computing task, based on the capabilities of the selected node (e.g., in terms of memory, disk, CPU, network, etc.) and the requirements of that application/task. More specifically, temporal metamodel 1000 can be used to create models that describe and predict these capabilities and requirements, so as to find the best 'fit' among the potential execution locations.

According to further embodiments, temporal metamodel 1000 may also support the sharing of different levels of abstraction of temporal metamodel 1000 among different DFRE agents. For instance, as shown in example 1010 in FIG. 10B, assume that the symbolic space of temporal metamodel 1000 is updated over time to reflect that the speed of a particular car suddenly drops to zero at the same time that the "hit" property of a dog suddenly changes from zero to one. In other words, there is a temporal correlation between the sudden stopping of the car and the dog being hit. By tracking the temporal changes/updates within temporal metamodel 1000, this allows various agents to piece together the event and/or make inferences about it (e.g., the dog ran into the road, the driver ran a stop sign, etc.). For instance, using the temporal information, different DFRE agents associated with different cameras may assess the accident from different camera angles, to better categorize how the accident occurred.

The sharing of different layers/levels of abstraction from temporal metamodel 1000 allows for the horizontal expansion or collapse of that layer by a particular agent, according to various embodiments. Indeed, agents may have varying needs of detail. Temporal metamodel 1000 allows for the selection of a layer of temporal metamodel 1000 ranging from the raw sensor data (e.g., the time series of video data, etc.) up to information at the symbolic layers of temporal metamodel 1000 (e.g., the high-level behaviors). In some embodiments, the provided information can also be compressed by the sender, such as through the use of an autoencoder to compress the raw sensor data, providing only a sub-set of the knowledge graph, or the like.

FIG. 10C illustrates an example 1020 showing the temporal aspects of the various memories associated with temporal metamodel 1000. As noted previously, a DFRE metamodel may be analyzed using both a short-term memory (STM) 1022, as well as a long-term memory (LTM) 1024. Here, the property type indicates either a relation in the knowledge graph of temporal metamodel 1000 or a node in the knowledge graph, and each of memories 1022-1024 stores time series information indicative of any updates to the relation or node. In turn, an episodic memory (EM) 1026 may store a dump of memory information from memories 1022-1024 for a particular incident. For instance, in the case of the dog being involved in a car accident, evaluation of the time series of changes in the nodes (e.g., representing a particular car and dog) can help to populate episodic memory 1026 with information regarding the accident.

Figure 11:
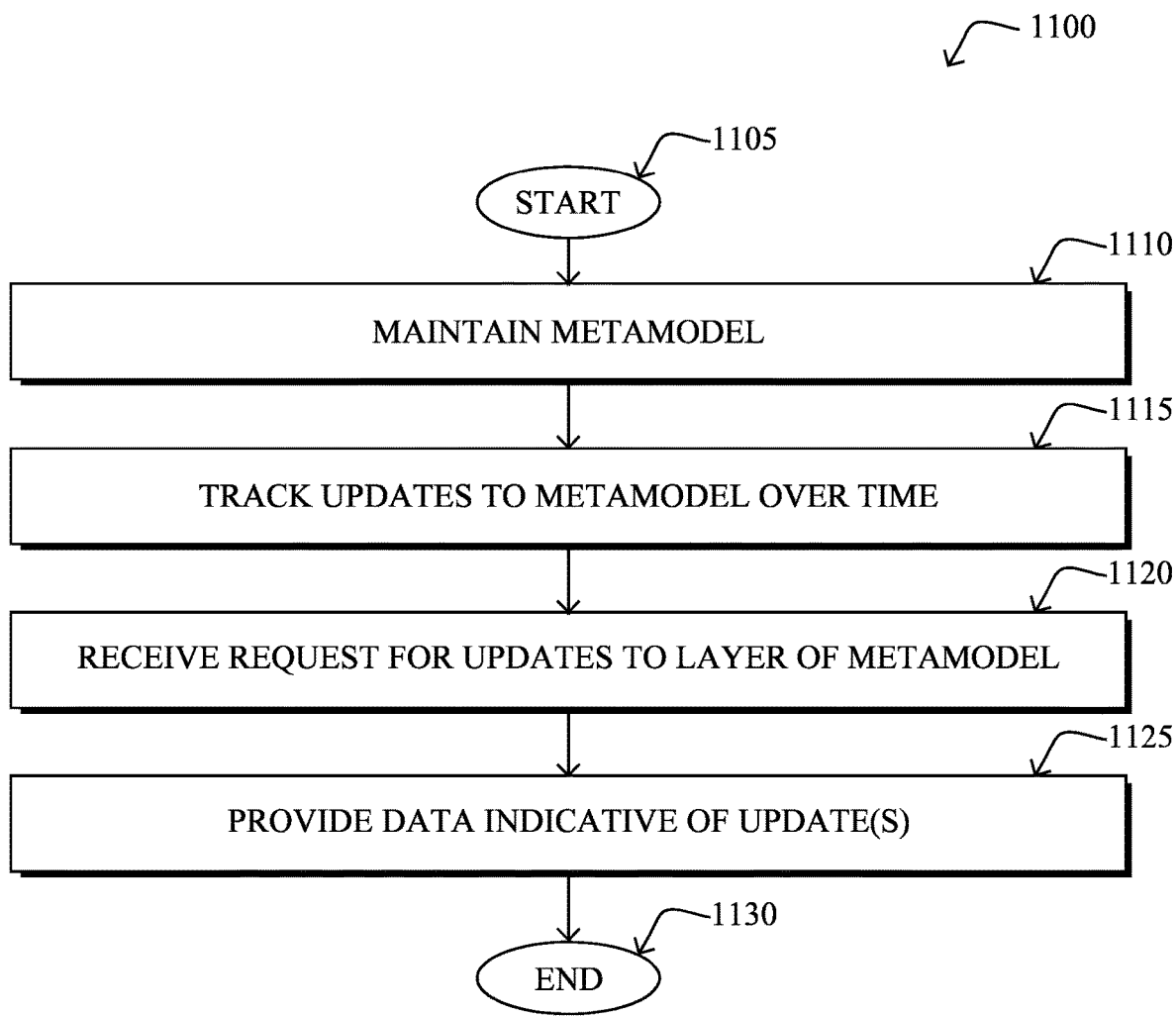
FIG. 11 illustrates an example simplified procedure for sharing metamodel data with a learning agent.

FIG. 11 illustrates a simplified procedure for sharing metamodel data with a learning agent, in accordance with one or more embodiments described herein. For example, a non-generic, specifically configured device (e.g., device 200) may perform procedure 1100 by executing stored instructions (e.g., processes 248). The procedure 1100 may start at step 1105, and continues to step 1110, where, as described in greater detail above, the device may maintain a metamodel that describes a monitored system, the metamodel comprising a plurality of layers ranging from a sub-symbolic space to a symbolic space.

At step 1115, as detailed above, the device may track updates to the metamodel over time. In various embodiments, the device may update the metamodel based in part on sub-symbolic time series data generated by the monitored system. For instance, consider the case in which the sub-symbolic time series data comprises video data from one or more cameras deployed to the monitored system. In such a case, analysis of the time series data using the metamodel may result in updates to the metamodel, such as by updating nodes or relations in the knowledge graph over time. In various embodiments, this tracking may itself be its own time series of updates.

At step 1120, the device may receive, from a learning agent, a request for the updates to a particular layer of the metamodel associated with a particular time period, as described in greater detail above. For instance, the learning agent may request sub-symbolic time series data or, alternatively, higher levels of abstraction, such as symbolic information stored in a knowledge graph of the metamodel. By way of example assume that the learning agent detects a particular event (e.g., a hit-and-run, a network failure, etc.) in the monitored system. In such a case, it may request additional information at a particular layer of the metamodel, to provide additional context, facilitate searching (e.g., to provide a user with multiple views of a traffic accident, etc.), or the like.

At step 1125, as detailed above, the device may provide data indicative of one or more updates to the particular layer of the metamodel associated with the specified time period. As would be appreciated, the learning agent may be executed by a different device than that of the device providing the data, such as a router, switch, gateway, or other computing device. Procedure 1100 then ends at step 1130.

It should be noted that while certain steps within procedure 1100 may be optional as described above, the steps shown in FIG. 11 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

Accordingly, a DFRE-based cognitive architecture is introduced that can be used to for a variety of purposes in networking, security, the IoT, collaboration, and the like. For example, in some aspects, the techniques herein can be used to help troubleshoot problems that arise in a computer network. In further aspects, the techniques herein can be used to assess video feeds across a plurality of cameras.

While there have been shown and described illustrative embodiments that provide for a cognitive learning framework, it is to be understood that various other adaptations and modifications may be made within the spirit and scope of the embodiments herein. For example, while certain embodiments are described herein with respect to using the DFRE to assess certain types of video, networking data, etc. the techniques herein are not limited as such and can be used generally to assess any form of data across a variety of use cases.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   maintaining, by a device, a metamodel that describes a monitored system, the metamodel comprising a plurality of layers ranging from a sub-symbolic space to a symbolic space and a knowledge graph that represents symmetric relations between concepts in the knowledge graph;
   tracking, by the device, updates to the metamodel over time comprising an update to a node in the plurality of layers or a relation in the knowledge graph, wherein the device updates the metamodel based in part on sub-symbolic time series data generated by the monitored system;

receiving, at the device and from a learning agent, a request for the updates to a particular layer or a particular relation of the metamodel associated with a specified time period; and providing, by the device and to the learning agent, data indicative of one or more updates to the particular layer or the particular relation of the metamodel associated with the specified time period.

2. The method as in claim 1, wherein the sub-symbolic time series data generated by the monitored system comprises video data.

3. The method as in claim 1, further comprising:
using a semantic reasoning engine on the symbolic space to make an inference about the monitored system.

4. The method as in claim 3, further comprising:
providing an indication of the inference about the monitored system to a user interface.

5. The method as in claim 1, wherein the monitored system comprises a distributed computing environment.

6. The method as in claim 1, wherein the device comprises a network router, switch, or gateway.

7. The method as in claim 6, wherein the learning agent is executed by a different network router, switch, or gateways as that of the device.

8. The method as in claim 1, wherein providing the data indicative of the one or more updates to the particular layer of the metamodel associated with the specified time period comprises:
forming the data indicative of the one or more updates by using an autoencoder to compress the sub-symbolic time series data.

9. The method as in claim 1, further comprising:
loading a subset of the metamodel into a short-term memory; and
evaluating the subset of the metamodel as a focus of attention.

10. An apparatus, comprising:
a network interface to communicate with a computer network;
a processor coupled to the network interface and configured to execute one or more processes; and
a memory configured to store a process that is executed by the processor, the process when executed configured to:
maintain a metamodel that describes a monitored system, the metamodel comprising a plurality of layers ranging from a sub-symbolic space to a symbolic space and a knowledge graph that represents symmetric relations between concepts in the knowledge graph;
track updates to the metamodel over time comprising an update to a node in the plurality of layers or a relation in the knowledge graph, wherein the apparatus updates the metamodel based in part on sub-symbolic time series data generated by the monitored system;

receive, from a learning agent, a request for the updates to a particular layer or a particular relation of the metamodel associated with a specified time period; and provide, to the learning agent, data indicative of one or more updates to the particular layer or the particular relation of the metamodel associated with the specified time period.

11. The apparatus as in claim 10, wherein the sub-symbolic time series data generated by the monitored system comprises video data.

12. The apparatus as in claim 10, wherein the process when executed is further configured to:
use a semantic reasoning engine on the symbolic space to make an inference about the monitored system.

13. The apparatus as in claim 12, wherein the process when executed is further configured to:
provide an indication of the inference about the monitored system to a user interface.

14. The apparatus as in claim 10, wherein the monitored system comprises a distributed computing environment.

15. The apparatus as in claim 10, wherein the apparatus comprises a network router, switch, or gateway.

16. The apparatus as in claim 15, wherein the learning agent is executed by a different network router, switch, or gateways as that of the apparatus.

17. The apparatus as in claim 10, wherein the apparatus provides the data indicative of the one or more updates to the particular layer of the metamodel associated with the specified time period by:
forming the data indicative of the one or more updates by using an autoencoder to compress the sub-symbolic time series data.

18. A tangible, non-transitory, computer-readable medium storing program instructions that cause a device to execute a process comprising:
maintaining, by a first learning agent executed by the device, a metamodel that describes a monitored system, the metamodel comprising a plurality of layers ranging from a sub-symbolic space to a symbolic space and a knowledge graph that represents symmetric relations between concepts in the knowledge graph;
tracking, by the first learning agent, updates to the metamodel over time comprising an update to a node in the plurality of layers or a relation in the knowledge graph, wherein the first learning agent updates the metamodel based in part on sub-symbolic time series data generated by the monitored system;
receiving, at the first learning agent and from a second learning agent, a request for the updates to a particular layer or a particular relation of the metamodel associated with a specified time period; and
providing, by the first learning agent and to the second learning agent, data indicative of one or more updates to the particular layer or the particular relation of the metamodel associated with the specified time period.

* * * * *

UNITED STATES PATENT AND TRADEMARK OFFICE
CERTIFICATE OF CORRECTION

| | |
|---|---|
| PATENT NO. | : 12,008,486 B2 |
| APPLICATION NO. | : 17/173380 |
| DATED | : June 11, 2024 |
| INVENTOR(S) | : Hugo Latapie et al. |

It is certified that error appears in the above-identified patent and that said Letters Patent is hereby corrected as shown below:

In the Specification

Column 4, Line 48 please amend as shown:
the next frontier in the evolution of the Internet is the ability to Column 7, Line 39 please amend as shown:
In general, a reasoning engine, also known as 'semantic reasoner,'

Column 18, Line 23 please amend as shown:
eration of churn of existing hardware to support these Signed and Sealed this
Third Day of September, 2024

Katherine Kelly Vidal
*Director of the United States Patent and Trademark Office*